(12) United States Patent
Kashihara et al.

(10) Patent No.: US 7,471,601 B2
(45) Date of Patent: Dec. 30, 2008

(54) OPTICAL DISK RECORDING/REPRODUCING METHOD, OPTICAL DISK RECORDING/REPRODUCING APPARATUS AND OPTICAL DISK

(75) Inventors: Yutaka Kashihara, Chigasaki (JP); Akihito Ogawa, Kawasaki (JP); Naoki Morishita, Yokohama (JP); Masaki Nakano, Tokyo (JP); Masatsugu Ogawa, Tokyo (JP); Shuichi Ookubo, Tokyo (JP); Toshiaki Iwanaga, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 683 days.

(21) Appl. No.: 11/143,996

(22) Filed: Jun. 3, 2005

(65) Prior Publication Data

US 2005/0270939 A1 Dec. 8, 2005

(30) Foreign Application Priority Data

Jun. 3, 2004 (JP) ............................. 2004-166191

(51) Int. Cl.
*G11B 7/00* (2006.01)
(52) U.S. Cl. .............. 369/47.53; 369/59.11; 369/53.11; 369/59.12
(58) Field of Classification Search ............... 369/47.53
See application file for complete search history.

(56) References Cited

U.S. PATENT DOCUMENTS 5,140,580 A 8/1992 Ohara et al.
6,714,503 B1 3/2004 Seo
2002/0067669 A1 6/2002 Maeda et al.
2003/0021204 A1 1/2003 Kashihara
2003/0058765 A1 3/2003 Schreurs et al.
2003/0174622 A1 9/2003 Nagai et al.

FOREIGN PATENT DOCUMENTS

| EP | 1 170 731 A1 | 1/2002 |
| EP | 1 251 498 A2 | 10/2002 |
| JP | 4-141827 | 5/1992 |
| JP | 7-130106 | 5/1995 |
| JP | 2000-149262 | 5/2000 |
| JP | 2002-25066 | 1/2002 |
| JP | 2003-317340 | 11/2003 |
| TW | I227022 | 1/2005 |

OTHER PUBLICATIONS

A New Method of Evaluating Signal Quality for Systems to which Partial Response☐☐and Maximum Likelihood Is Applied Yuji Nagai, Akihito Ogawa and Yutaka Kashihara, Jpn. J. Appl. Phys. vol. 42 (2003) pp. 971-975 Part 1, No. 2B, Feb. 2003.*

* cited by examiner

Primary Examiner—Jorge L Ortiz Criado
(74) Attorney, Agent, or Firm—Oblon, Spivak, McClelland, Maier & Neustadt, P.C.

(57) ABSTRACT

In an optical disk system using a PRML identification system, a method for deriving an optimum recording wave in a short period of time is provided. Parameters of the recording wave are adjusted by using an evaluation value obtained by a signal evaluation method which is suitable for the PRML identification system as an index. In this case, as a parameter adjusting method, a plurality of adjusting methods are utilized.

14 Claims, 15 Drawing Sheets

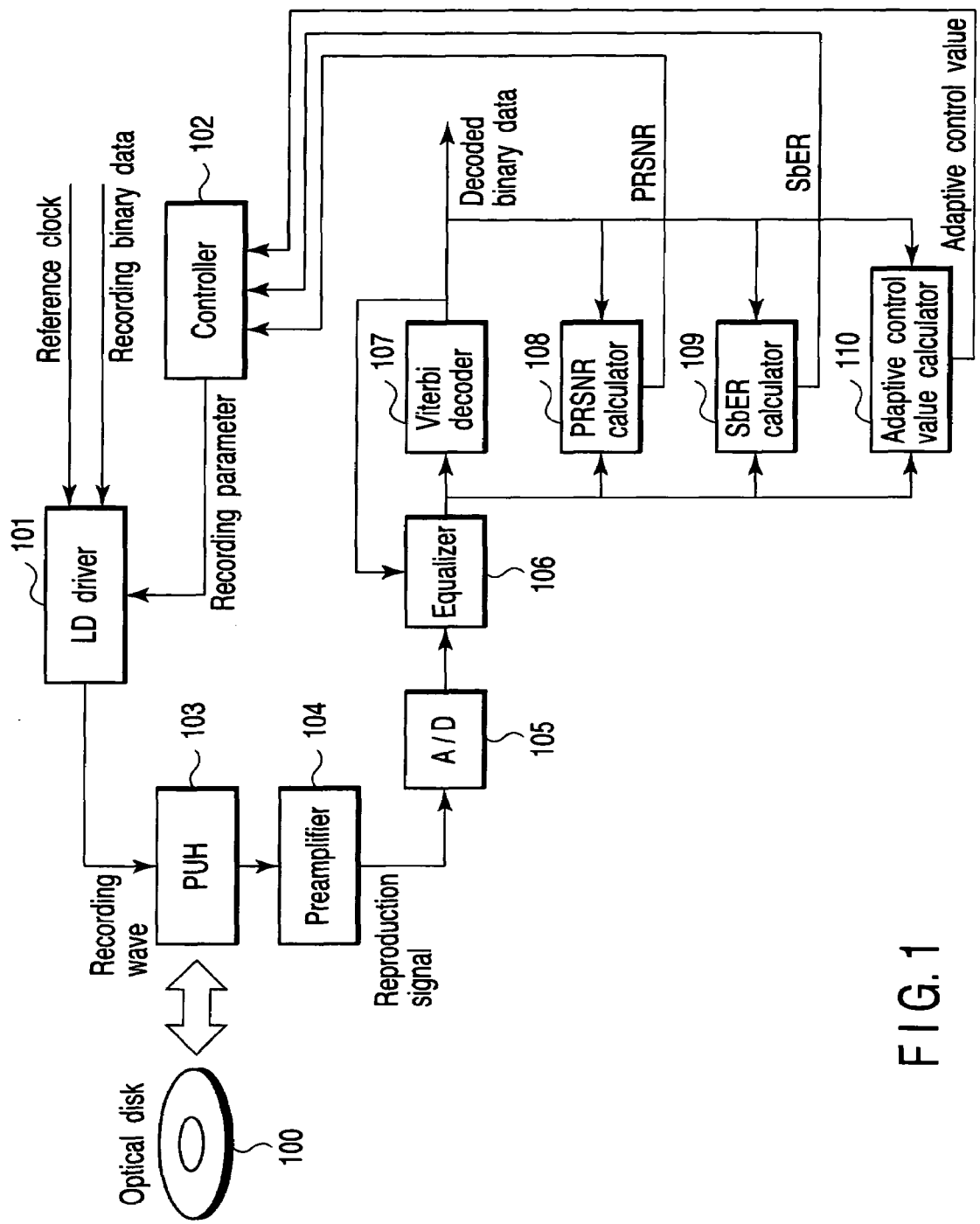
F I G. 1

OPTICAL DISK RECORDING/REPRODUCING METHOD, OPTICAL DISK RECORDING/REPRODUCING APPARATUS AND OPTICAL DISK

CROSS-REFERENCE TO RELATED APPLICATIONS

This application is based upon and claims the benefit of priority from prior Japanese Patent Application No. 2004-166191, filed Jun. 3, 2004, the entire contents of which are incorporated herein by reference.

BACKGROUND OF THE INVENTION

1. Field of the Invention

This invention relates to an optical disk recording/reproducing method, optical disk recording/reproducing apparatus and optical disk and more particularly to parameter adjustment at the recording time of a signal on an optical disk and at the reproducing time of a signal from the optical disk.

2. Description of the Related Art

When information is recorded on an optical disk, a laser beam is used. At this time, it is required to optimize the recording power of the laser beam. As the technique for optimizing the recording power, the technique disclosed in Jpn. Pat. Appln. KOKAI Publication No. H4-141827 is provided.

In Jpn. Pat. Appln. KOKAI Publication No. H4-141827, information is recorded and the amplitude of a reproduction signal obtained at this time is measured while the recording power is gradually changed. An optimum value of the recording power is derived based on the relation between the recording power and the amplitude of the reproduction signal. Further, information is recorded and the bit error rate obtained at this time is measured while the recording power is gradually changed. An optimum value of the recording power is derived based on the relation between the recording power and the bit error rate. The recording waveform of an electrical signal to generate a laser beam takes a so-called multi-pulse form which is repeatedly set at high and low levels in a short period of time. If the laser beam obtained by use of the recording waveform is applied to a track of the optical disk, marks are formed. Data contents are expressed by the widths of marks and spaces arranged on the track.

As the technique using the relation between the first and last pulses of the recording wave of the multi-pulse form, the technique disclosed in Jpn. Pat. Appln. KOKAI Publication No. 2000-149262 is provided. In this case, the first pulse of the recording wave of the multi-pulse form is called the first pulse and the last pulse thereof is called the last pulse. In Jpn. Pat. Appln. KOKAI Publication No. 2000-149262, the recording waveform is divided into pattern groups by using the length of each mark to be recorded and the length of a space preceding (or succeeding to) the mark as a pair and the width of the first pulse (or last pulse) is optimized for each pattern group. Information is recorded by changing the width of the first pulse (or last pulse) and the amount of jitter occurring at this time is measured. The jitter amount is a variation in time at which the reproduction signal passes through a slice level set in a level slicer. The optimum value of the width of the first pulse (or last pulse) is derived based on the relation between the width of the first pulse (or last pulse) and the jitter amount.

As a system for reproducing information recorded on the optical disk, a slice and identification system and PRML (Partial Response and Maximum Likelihood) identification system are provided.

Simply speaking, the slice and identification system converts reflection light reflected from the optical disk into an electrical signal by use of the photoelectric converter of a pickup head. The electrical signal is sliced in the slice circuit and converted into decoded binary data.

The PRML identification system is as follows. In the PRML identification system, a PR (Partial Response) characteristic corresponding to the recording/reproducing characteristic is used. As an example, a PR(1, 2, 2, 2, 1) characteristic is explained. The PR(1, 2, 2, 2, 1) characteristic indicates a characteristic in which a reproduction signal corresponding to a code bit "1" is set to "12221". A reproduction signal is obtained by the convolution operation for the code bit series and the series of "12221" indicating the PR characteristic. For example, a reproduction signal for the code bit series "0100000000" is set to "0122210000". Likewise, a reproduction signal for the code bit series "0110000000" is set to "0134431000", a reproduction signal for the code bit series "0111000000" is set to "0135653100", a reproduction signal for the code bit series "0111100000" is set to "00135775310" and a reproduction signal for the code bit series "0111110000" is set to "0135787531". In the PR(1,2, 2,2,1) characteristic, the reproduction signal is set to nine levels. The reproduction signal calculated by the convolution operation is an ideal reproduction signal (which is hereinafter referred to as a pass). However, in the actual reproduction signal, the characteristic is not always exactly set to the PR(1, 2,2,2,1) characteristic and the reproduction signal contains deterioration factors such as noises. In the PRML identification system, the characteristic of a reproduction signal is set closer to the PR characteristic by use of an equalizer. The reproduction signal with the characteristic set closer to the PR characteristic is called an equalized reproduction signal. After this, a pass having the minimum Euclidean distance with respect to the equalized reproduction signal is selected by use of a Viterbi decoder. The pass and code bit series are set in a one-to-one correspondence. The Viterbi decoder outputs a code bit series corresponding to the selected pass as decoded binary data.

Recently, with an increase in the density of the optical disk, the PRML identification system is more frequently used instead of the slice and identification system.

In the optical disk system using the PRML identification system, it is assumed that the reproduction signal is not a binary signal but a signal with a three or more values or a so-called multi-value signal. The amplitude of the reproduction signal is a difference in level between the maximum and minimum values of the reproduction signal. A method for optimizing the recording waveform based on the measured value of the amplitude of the reproduction signal is a method based on the assumption that the reproduction signal is a binary signal. That is, the recording waveform is different from the recording waveform optimum for the optical disk system using the PRML identification system.

In the optical disk system using the PRML identification system, a reduction in the jitter amount does not always lead to enhancement of the quality of the reproduction signal. That is, the recording waveform cannot always be optimized by using the measurements of the jitter amount.

In the measurement of the bit error rate, measured values greatly vary due to local defects of the optical disk. Therefore, the recording waveform cannot be sufficiently optimized by use of the method for optimizing the recording waveform based on the measured values of the bit error rate because of an influence by a variation in the bit error rate. Further, in order to measure the bit error rate, it is necessary to record/reproduce an extremely long code bit series on the optical disk. Therefore, the method for optimizing the recording waveform based on the measured values of the bit error rate requires a long time for optimizing the recording waveform.

BRIEF SUMMARY OF THE INVENTION

An object of the embodiments of this invention is to provide a method for deriving an optimum recording waveform in an optical disk system using the PRML identification system.

Another object of this invention is to provide a method for optimizing the recording waveform in a short period of time in the optical disk system using the PRML identification system.

Further, still another object of this invention is to provide an optical disk recording/reproducing apparatus capable of performing an optimum recording/reproducing operation in the optical disk system using the PRML identification system.

Another object of this invention is to provide an optical disk on which information is recorded by use of an optimum recording waveform in the optical disk system using the PRML identification system.

In order to attain the above objects, in one embodiment described below, a first recording parameter is determined according to a first recording parameter adjusting method, information is recorded on a medium by use of the first recording parameter, an evaluation value of the signal quality is derived from the reproduction signal by a signal quality evaluation method, the operation of adjusting the recording parameter is terminated (for example, steps S1 to S4 in FIG. 3) when the evaluation value satisfies a previously specified value, a second recording parameter is determined according to a second recording parameter adjusting method when the evaluation value does not satisfy the previously specified value, information is recorded on the medium by use of the second recording parameter, an evaluation value of the signal quality is derived from the reproduction signal by the signal quality evaluation method, the operation of adjusting the recording parameter is terminated when the evaluation value satisfies a previously specified value, and an alarm is issued when the evaluation value does not satisfy the previously specified value (for example, steps S5 to S6 in FIG. 3).

In the optical disk system using the PRML identification system, an optimum recording parameter can be attained by use of the above optical disk recording/reproducing method.

In the optical disk system using the PRML identification system, a recording parameter can be attained in a short period of time by use of the above optical disk recording/reproducing method.

Further, an optical disk recording/reproducing apparatus which can correctly record/reproduce information by using a recording waveform derived by the optical disk recording/reproducing method can be provided.

In addition, an optical disk on which information is correctly recorded by recording information by use of a recording waveform derived by the optical disk recording/reproducing method can be provided.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing one example of an optical disk recording/reproducing apparatus of this invention;

DETAILED DESCRIPTION OF THE INVENTION

Figure 2:
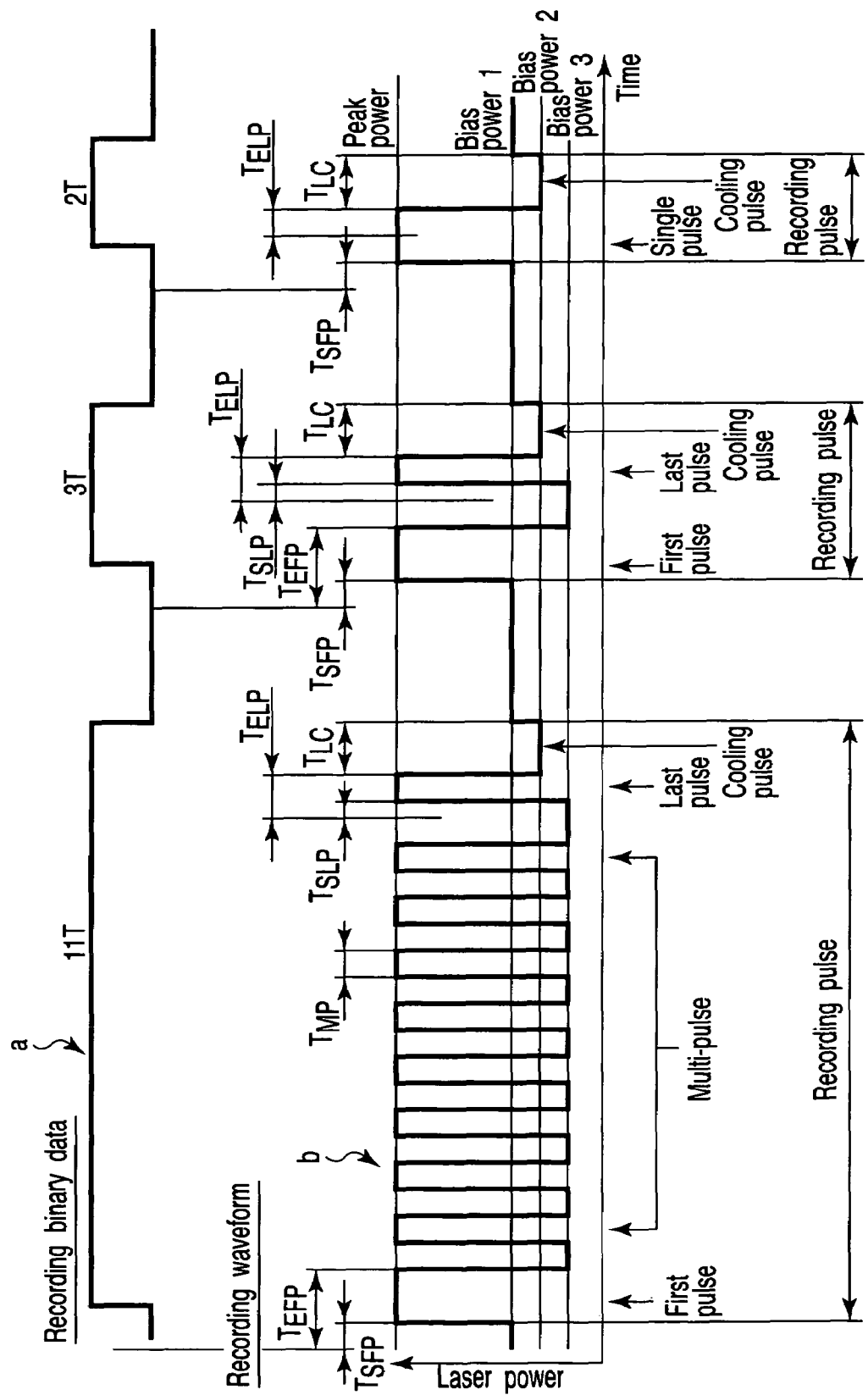
FIG. 2 is an explanatory diagram showing an example of a recording waveform according to this invention.

There will now be described embodiments of an optical disk recording/reproducing apparatus, recording method and optical disk medium according to this invention with reference to the accompanying drawings.

FIG. 1 is a block diagram showing an optical disk recording/reproducing apparatus. Recording binary data is converted into a series in which at least two "0s" or "1s" in the code bit series successively occur by use of a modulator (not shown) whose run length is "1". The recording binary data is converted into a recording wave according to a recording parameter output from a controller 102 by use of a laser diode (LD) driver 101. The recording wave of an electrical signal is converted into an optical signal by a pickup head (PUH) 103 and then applied onto an optical disk 100. On the optical disk 100, marks are formed according to application of the laser light. As the optical disk 100, a land & groove recording type optical disk is used.

At the reproduction time, information recorded on the optical disk 100 is reproduced as a weak analog signal by use of the PUH 103. The analog signal is amplified to a sufficiently high signal level by use of a preamplifier 104 and then converted into a digital signal sampled at a constant frequency by an analog-digital converter (ADC) 105. A digital reproduction signal is converted into a signal which is synchronized with a channel clock in an equalizer 106 containing a phase-locked loop (PLL) and, at the same time, it is converted into an equalized reproduction signal of a characteristic which is close to the PR($1,2,2,2,1$) characteristic. The equalization coefficient used in the equalizer 106 is derived from the signal which is synchronized with the channel clock and decoded binary data.

After this, in a Viterbi decoder 107, a pass is selected. The Euclidean distance of the pass with respect to the equalized reproduction signal is minimum and a code bit series corresponding to the selected pass is output as decoded binary data.

The equalized reproduction signal and decoded binary data are input to a PRSNR (Partial Response Signal to Noise Ratio) calculator 108 and an evaluation value PRSNR is measured. Further, the equalized reproduction signal and decoded binary data are also input to an SbER (Simulated bit Error Rate) calculator 109 and an evaluation value SbER is measured. In addition, the equalized reproduction signal and decoded binary data are input to an adaptive control value calculator 110 and an adaptive control value is measured. The measured PRSNR, SbER and adaptive control value are supplied to the controller 102 and the evaluation value is evaluated. Further, the recording parameter is adjusted and modified. In addition, the first and second recording parameter adjusting methods are selectively switched. Although not shown in the drawing, an alarm signal is output as a warning as required.

Further, as will be described in detail later, the relation between the recording parameter and the evaluation value is measured in the controller 102, the optimum value of the evaluation values is derived based on the measurement result and the recording parameter which causes the evaluation value to be set as the optimum value can be determined as an adjusted value. In addition, in the controller 102, the relation between the recording parameter and the evaluation value is measured, the optimum value of the evaluation values is derived based on the result of measurement and a certain value smaller than or equal to the optimum value may be set as a specified value. Then, the upper limit value and lower limit value of the recording parameters which satisfy the specified value are determined and an intermediate value of the upper limit and lower limit values is set as an adjusted value of the recording parameter.

(Recording Waveform)

FIG. 2 shows the configurations of recording binary data a and recording waveform b. Marks are formed on the optical disk in correspondence to high levels of the recording binary data ("a" in FIG. 2). The recording waveform b contains a single pulse to record the shortest 2T mark. As a mark to be recorded becomes longer, the number of pulses of the recording waveform b becomes larger. The recording parameters are individually set when information is recorded on the land track and when information is recorded on the groove track. The recording parameters are shown in the TABLE 1.

TABLE 1

| Recording Parameter for Land Track | Peak Power, Bias Power 1, Bias Power 2, Bias Power 3, $T_{SFP}$, $T_{EFP}$, $T_{MP}$, $T_{SLP}$, $T_{ELP}$, $T_{LC}$ |
|---|---|
| Recording Parameter for Groove Track | Peak Power, Bias Power 1, Bias Power 2, Bias Power 3, $T_{SFP}$, $T_{EFP}$, $T_{MP}$, $T_{SLP}$, $T_{ELP}$, $T_{LC}$ |

$T_{LC}$, $T_{SFP}$, $T_{ELP}$ among the recording parameters in the time-base direction are adaptive control parameters. That is, the mark length and space length are classified into three groups of 2T, 3T and $\geq$4T ($\geq$4T indicates the length larger than or equal to 4T) and individual parameters are set for respective groups. Values different for respective mark lengths can be set for $T_{LC}$. Further, values different for respective mark lengths and the lengths of spaces preceding the marks can be set for $T_{SFP}$. Likewise, values different for respective mark lengths and the lengths of spaces succeeding to the marks can be set for $T_{ELP}$. The adaptive control parameters are shown in the TABLE 2.

TABLE 2

| | | Mark Length | | |
|---|---|---|---|---|
| | | 2T | 3T | $\geq$4T |
| $T_{LC}$ for Land Track | | al | bl | cl |
| $T_{SFP}$ for Land Track | | | | |
| Preceding Space Length | 2T | dl | el | fl |
| | 3T | gl | hl | il |
| | $\geq$4T | jl | kl | ll |
| $T_{ELP}$ for Land Track | | | | |
| Succeeding Space Length | 2T | ml | nl | ol |
| | 3T | pl | ql | rl |
| | $\geq$4T | sl | tl | ul |
| $T_{LC}$ for Groove Track | | ag | bg | cg |
| $T_{SFP}$ for Groove Track | | | | |
| Preceding Space Length | 2T | dg | eg | fg |
| | 3T | gg | hg | ig |
| | $\geq$4T | jg | kg | lg |
| $T_{ELP}$ for Groove Track | | | | |
| Succeeding Space Length | 2T | mg | ng | og |
| | 3T | pg | qg | rg |
| | $\geq$4T | sg | tg | ug |

(Recording Parameter Adjusting Procedure)

Figure 3:
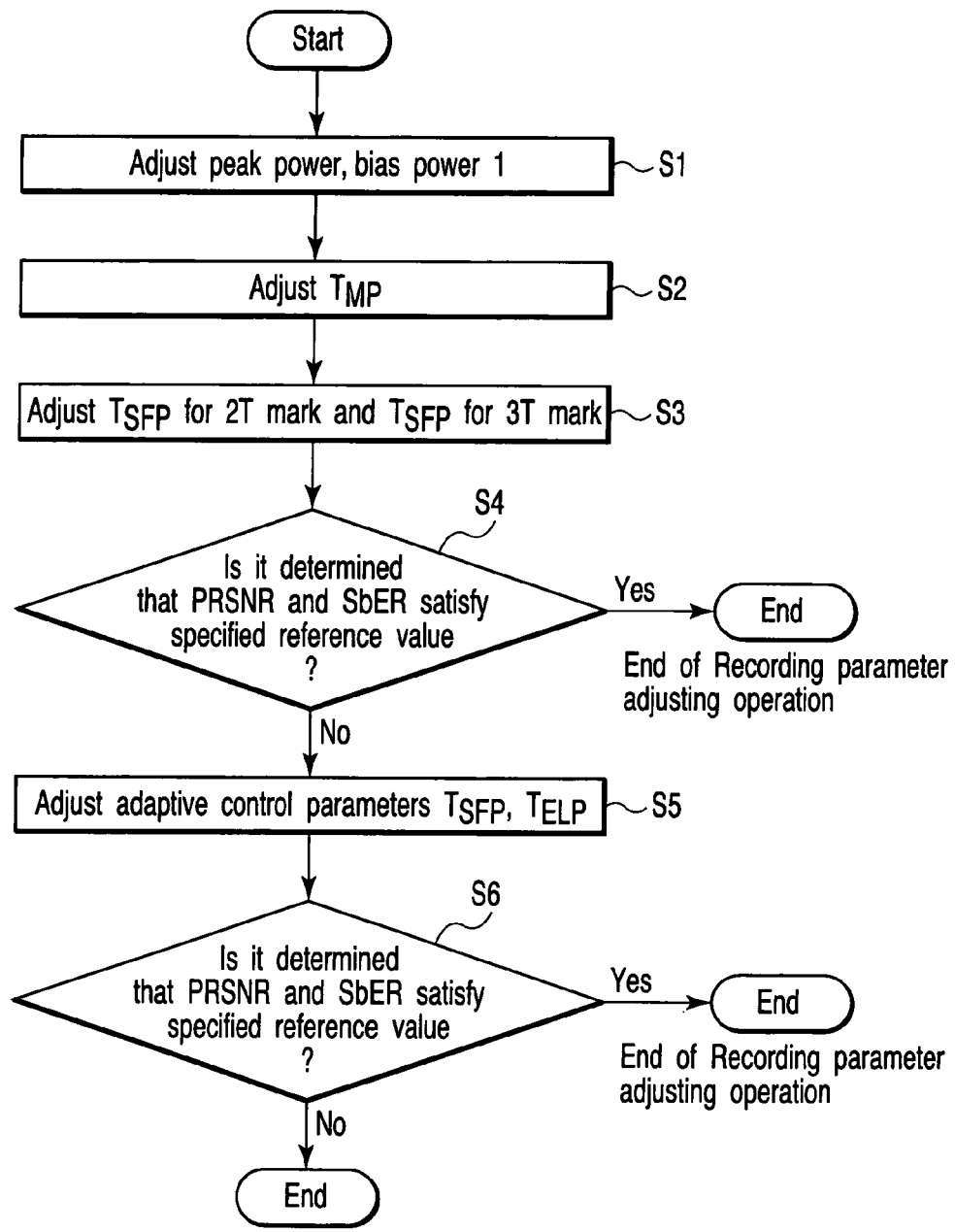
FIG. 3 is a flowchart for illustrating an example of an optical disk recording/reproducing method according to this invention.

The recording parameter adjusting procedure is explained. Since the adjusting procedures for the land track recording parameters and groove track recording parameters are the same, only the land track recording parameter adjusting procedure is explained here. The outline of the adjusting procedure is shown in FIG. 3.

(Adjustment of Peak Power and Bias Power 1: Step S1 in FIG. 3)

1. The peak power is set to an initial value $P_{P0}$. $P_{P0}$ is previously recorded in a preset position on the optical disk. A value in a corresponding portion is reproduced and the thus attained value is set. Likewise, the bias power 1, bias power 2 and bias power 3 are set to initial values $P_{B10}$, $P_{B20}$ and $P_{B30}$. The initial values $P_{B10}$, $P_{B20}$, $P_{B30}$ are previously recorded in preset positions on the optical disk. Likewise, the time-base parameters $T_{SFP}$, $T_{EFP}$, $T_{MP}$, $T_{SLP}$, $T_{ELP}$, $T_{LC}$ are set to initial values. The initial values of the time-base parameters are previously recorded in preset positions on the optical disk. In this example, the peak power and bias power 1 are treated as variables.

2. After random data is successively recorded ten times on a certain track, the random data is reproduced to derive an equalization coefficient. In the succeeding procedure, the thus derived equalization coefficient is used.

3. Random data is successively recorded ten times on a certain track. The operation of successively recording random data ten times is performed each time the peak power and bias power 1 are adjusted. PRSNR is measured each time the peak power and bias power 1 are adjusted. The peak power and bias power 1 are adjusted so as to increase PRSNR. The adjusting operation is performed to set the ratio of the peak power to the bias power 1 equal to that of $P_{P0}$ to $P_{B10}$.

Figure 4:
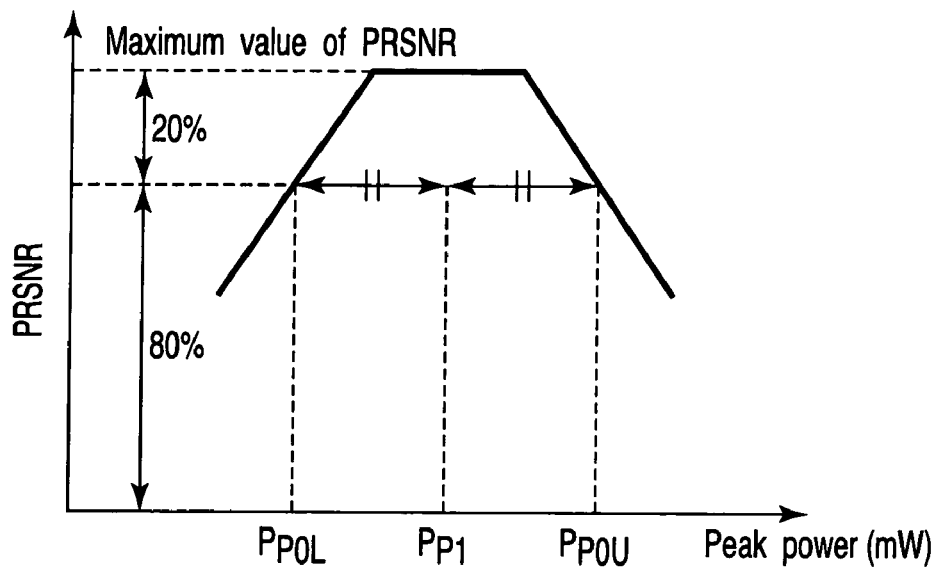
FIG. 4 is an explanatory diagram showing an example of a recording power adjusting method.

4. The relation between the peak power and PRSNR is derived in the procedure 3 (refer to FIG. 4).

5. The maximum value of PRSNR is derived.

6. The upper limit value $P_{POU}$ and the lower limit value $P_{POL}$ of the peak power which is set to 80% or more of the maximum value of PRSNR are derived.

7. The adjusted value $P_{P1}$ of the peak power and the adjusted value $P_{B11}$ of the bias power 1 are derived according to the following equations.

$$P_{P1} = (P_{POL} + P_{POU})/2$$

$$P_{B11} = (P_{B10}/P_{P0}) \times P_{P1}$$

An adjusting method of setting the maximum value of PRSNR derived in the procedure 5 to $P_{P1}$ may be used. In the procedure 6, the specified value is set to 80% or more of the maximum value, but this is not limitative. Further, PRSNR is set as an evaluation value, but SbER may be used as an evaluation value. When SbER is used as the evaluation value, the peak power and bias power 1 are adjusted to make the SbER value smaller.

(Adjustment of $T_{MP}$: Step S2 in FIG. 3)

1. The peak power is set to $P_{P1}$. The bias power 1, bias power 2 and bias power 3 are set to $P_{B11}$, $P_{B20}$ and $P_{B30}$. The time-base parameters $T_{SFP}$, $T_{EFP}$, $T_{MP}$, $T_{SLP}$, $T_{ELP}$, $T_{LC}$ are set to initial values. In this example, $T_{MP}$ is treated as a variable.

2. Random data is successively recorded ten times on a certain track. The operation of successively recording random data ten times is performed each time $T_{MP}$ is adjusted. PRSNR is measured each time $T_{MP}$ is adjusted. $T_{MP}$ is adjusted so as to increase PRSNR.

Figure 5:
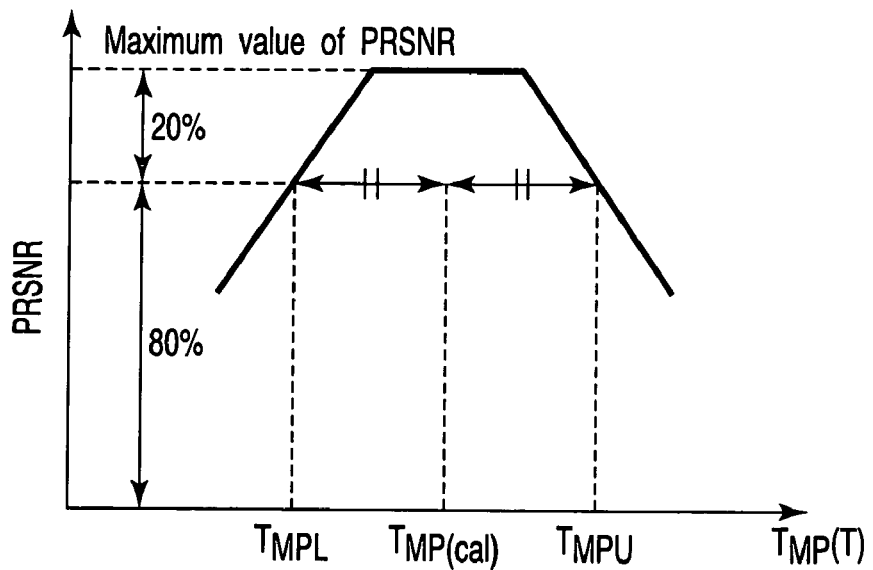
FIG. 5 is an explanatory diagram for illustrating an intermediate multi-pulse width adjusting method.

3. The relation between $T_{MP}$ and PRSNR is derived in the procedure 2 (refer to FIG. 5).

4. The maximum value of PRSNR is derived.

5. The upper limit value $P_{MPU}$ and the lower limit value $P_{MPL}$ of $T_{MP}$ which is set to 80% or more of the maximum value of PRSNR are derived.

6. The adjusted value $T_{MP(cal)}$ of $T_{MP}$ is derived according to the following equation.

$$T_{MP(cal)} = (T_{MPL} + T_{MPU})/2$$

An adjusting method for setting the maximum value of PRSNR derived in the procedure 4 to $T_{MP(cal)}$ may be used. In the procedure 5, the specified value is set to 80% or more of the maximum value, but this is not limitative. Further, PRSNR is set as an evaluation value, but SbER may be used as an evaluation value. When SbER is used as the evaluation value, $T_{MP}$ is adjusted to make the SbER value smaller.

(Adjustment of $T_{SFP}$ for 2T Mark and $T_{SFP}$ for 3T Mark: Step S3 in FIG. 3)

1. The peak power is set to $P_{P1}$. The bias power 1, bias power 2 and bias power 3 are set to $P_{B11}$, $P_{B20}$ and $P_{B30}$. $T_{MP}$ is set to $T_{MP(cal)}$. The other time-base parameters $T_{SFP}$, $T_{EFP}$, $T_{SLP}$, $T_{ELP}$, $T_{LC}$ are set to initial values. In this example, $T_{SFP}$ for a 2T mark and $T_{SFP}$ for a 3T mark are treated as variables. The $T_{SFP}$ for a 2T mark is expressed by d1, g1, j1 in the TABLE 2. Likewise, $T_{SFP}$ for a 3T mark is expressed by e1, h1, k1 in the TABLE 2.

2. Random data is successively recorded ten times on a certain track. The operation of successively recording random data ten times is performed each time $T_{SFP}$ for a 2T mark is adjusted. PRSNR is measured each time $T_{SFP}$ is adjusted. $T_{SFP}$ is adjusted so as to increase PRSNR.

Figure 6:
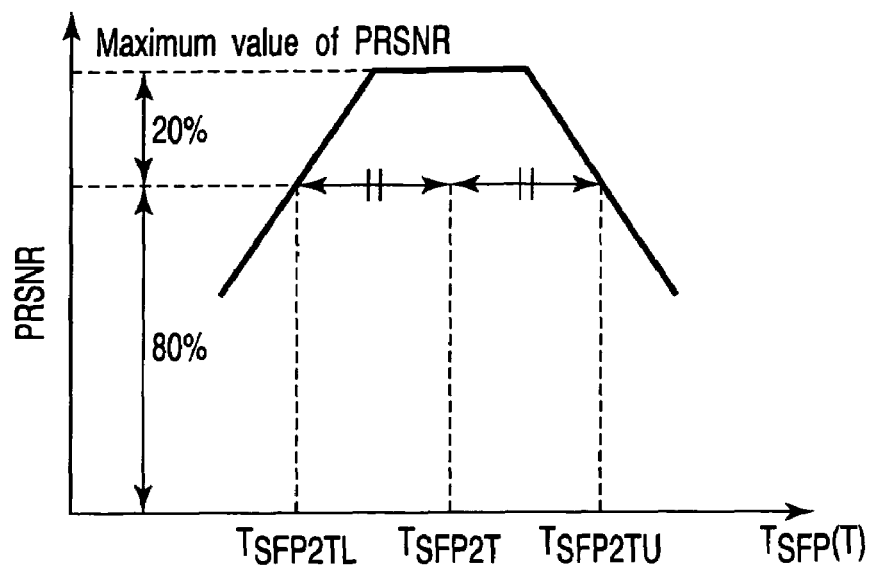
FIG. 6 is an explanatory diagram for illustrating a first pulse width adjusting method at the 2T mark recording time.

3. The relation between $T_{SFP}$ and PRSNR is derived in the procedure 2 (refer to FIG. 6).

4. The maximum value of PRSNR is derived.

5. The upper limit value $P_{SFP2TU}$ and the lower limit value $P_{SFP2TL}$ of $T_{SFP}$ for the 2T mark which is set to 80% or more of the maximum value of PRSNR are derived.

6. The adjusted value $T_{SFP2T}$ of $T_{SFP}$ for the 2T mark is derived according to the following equation.

$$T_{SFP2T} = (T_{SFP2TL} + T_{SFP2TU})/2$$

7. Random data is successively recorded ten times on a certain track. The operation of successively recording random data ten times is performed each time $T_{SFP}$ for a 3T mark is adjusted. PRSNR is measured each time $T_{SFP}$ is adjusted. $T_{SFP}$ is adjusted so as to increase PRSNR.

Figure 7:
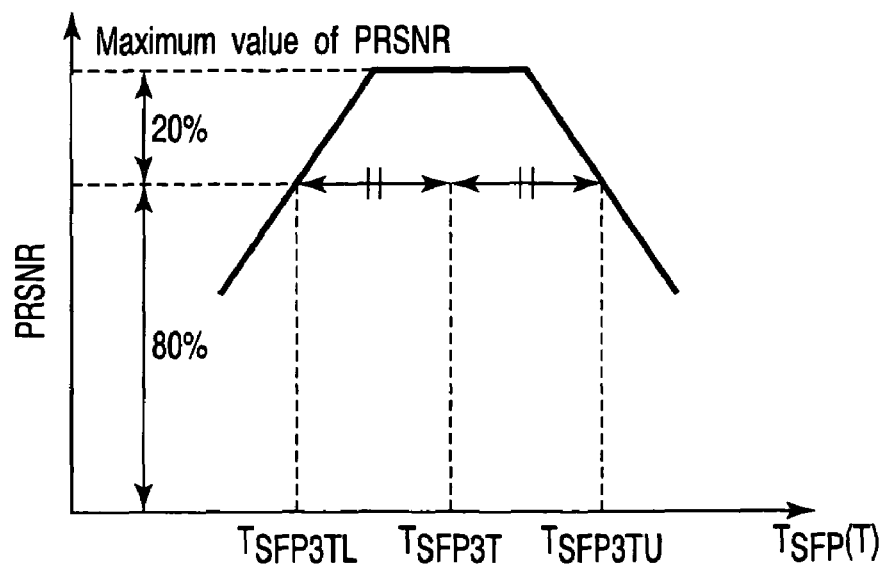
FIG. 7 is an explanatory diagram for illustrating a first pulse width adjusting method at the 3T mark recording time.

8. The relation between $T_{SFP}$ and PRSNR is derived in the procedure 7 (refer to FIG. 7).

9. The maximum value of PRSNR is derived.

10. The upper limit value $P_{SFP3TU}$ and the lower limit value $P_{SFP3TL}$ of $T_{SFP}$ for the 3T mark which is set to 80% or more of the maximum value of PRSNR are derived.

11. The adjusted value $T_{SFP3T}$ of $T_{SFP}$ for the 3T mark is derived according to the following equation.

$$T_{SFP3T} = (T_{SFP3TL} + T_{SFP3TU})/2$$

An adjusting method for setting the maximum value of PRSNR derived in the procedure 4 to $T_{SFP2T}$ and setting the maximum value of PRSNR derived in the procedure 9 to $T_{SFP3T}$ may be used. In the procedures 5 and 10, the specified value is set to 80% or more of the maximum value, but this is not limitative. Further, PRSNR is set as an evaluation value, but SbER may be used as an evaluation value. When SbER is used as the evaluation value, $T_{SFP}$ is adjusted to make the SbER value smaller.

(Determination as to Whether PRSNR and SbER Satisfy Specified Standard Value or Not: Step S4 in FIG. 3)

1. The peak power is set to $P_{P1}$. The bias power 1, bias power 2 and bias power 3 are set to $P_{B11}$, $P_{B20}$ and $P_{B30}$. $T_{MP}$ is set to $T_{MP(cal)}$. $T_{SFP}$ for the 2T mark is set to $T_{SFP2T}$. $T_{SFP}$ for the 3T mark is set to $T_{SFP3T}$. The other time-base parameters $T_{SFP}$, $T_{EFP}$, $T_{SLP}$, $T_{ELP}$, $T_{LC}$ are set to initial values.

2. Random data is successively recorded ten times on five adjacent tracks.

3. Data recorded on a central one of the tracks used in the procedure 2 is reproduced and an equalization coefficient is derived. In the succeeding procedure, the thus derived equalization coefficient is used.

4. PRSNR and SbER are measured.

5. If PRSNR is set more than or equal to 15.0 and SbER is set less than or equal to $5 \times 10^{-5}$, the recording parameters set in the procedure 1 are used as parameters obtained after adjustment and then the recording parameter adjusting procedure is terminated. If PRSNR is less than 15.0 or SbER is larger than $5 \times 10^{-5}$, the following adaptive control parameter adjusting procedure is performed.

In the procedure 5, PRSNR is set more than or equal to 15.0 and SbER is set less than or equal to $5 \times 10^{-5}$, but this invention is not limited to this case. For example, PRSNR may be set more than or equal to 13.0 and SbER may be set less than or equal to or $5 \times 10^{-4}$.

(Adjustment of Adaptive Control Parameters $T_{SFP}$, $T_{ELP}$: Step S5 in FIG. 3)

1. The peak power is set to $P_{P1}$. The bias power 1, bias power 2 and bias power 3 are set to $P_{B11}$, $P_{B20}$ and $P_{B30}$. $T_{MP}$ is set to $T_{MP(cal)}$. $T_{SFP}$ for the 2T mark is set to $T_{SFP2T}$. $T_{SFP}$ for the 3T mark is set to $T_{SFP3T}$. The other time-base parameters $T_{SFP}$, $T_{EFP}$, $T_{SLP}$, $T_{ELP}$, $T_{LC}$ are set to initial values. In this example, nine types of $T_{SFP}$, $T_{EFP}$ classified according to the mark length and space length, that is, dl, el, fl, gl, hl, il, jl, kl, ll, ml, nl, ol, pl, ql, rl, sl, tl, ul in the TABLE 2 are independently adjusted.

2. Random data of the length longer than or equal to 928512 channel bits is successively recorded ten times on a certain track. The operation of successively recording random data ten times is performed each time $T_{SFP}$, $T_{ELP}$ are adjusted.

3. The adaptive control value is measured. The adaptive control value is calculated for each of nine types of $T_{SFP}$, $T_{ELP}$ and the value is set to +1, 0 or −1.

4. If the adaptive control value for certain $T_{SFP}$ ($T_{ELP}$) is +1, $T_{SFP}$ ($T_{ELP}$) is reduced (increased) by time $\Delta T$. If the adaptive control value for certain $T_{SFP}$ ($T_{ELP}$) is −1, $T_{SFP}$ ($T_{ELP}$) is increased (reduced) by time $\Delta T$. In this case, $\Delta T$ is T/32.

5. The procedures 2 to 4 are repeatedly performed until all of the adaptive control values are set to 0. If all of the adaptive control values are set to 0, $T_{SFP}$ and $T_{ELP}$ obtained at this time are respectively set to $T_{SFP(cal)}$ and $T_{ELP(cal)}$.

In the above case, the procedures are repeatedly performed until all of the adaptive control values are set to 0, but this invention is not limited to this case. For example, the procedures may be repeatedly performed until 80% or more of the control values are set to 0. Alternatively, the procedures may be repeatedly performed until the control values are set to as close to 0 as possible. Further, the number of repetition times is previously specified and the procedures may be repeatedly performed by the specified number of times.

The adaptive control value is set to one of three types of [−1, 0, +1], but this invention is not limited to this case. For example, the adaptive control value is set to one of five types of [−2, −1, 0, +1, +2].

Further, $\Delta T$ is set to T/32, but this is not limitative and $\Delta T$ may be set to T/16, for example.

(Features of First Half and Latter Half of Data Processing Flow of FIG. 3)

The first half is a first recording parameter adjusting method and is one of or both of an adjusting method which is independent of a recording data bit string and an adjusting method which is dependent on the run length (consecutive length) of a code bit "1" of the recording data bit string. The latter half is a second recording parameter adjusting method and is an adjusting method which is dependent on the run length of a code bit "1" of the recording data bit string and the run length of a code bit "0" adjacent thereto.

(Determination as to Whether Optical Disk is Improper or Not)

1. The peak power is set to $P_{P1}$. The bias power 1, bias power 2 and bias power 3 are set to $P_{B11}$, $P_{B20}$ and $P_{B30}$. $T_{MP}$, $T_{SFP}$, $T_{ELP}$ are set to $T_{MP(cal)}$, $T_{SFP(cal)}$, $T_{ELP(cal)}$. The other time-base parameters $T_{EFP}$, $T_{ELP}$, $T_{LC}$ are set to initial values.

2. Random data is successively recorded ten times on five adjacent tracks.

3. Data recorded on a central one of the tracks used in the procedure 2 is reproduced and an equalization coefficient is derived. In the succeeding procedure, the thus derived equalization coefficient is used.

4. PRSNR and SbER are measured.

5. If PRSNR is set equal to or more than 15.0 and SbER is set equal to or less than $5 \times 10^{-5}$, the recording parameters set in the procedure 1 are used as parameters obtained after adjustment and then the recording parameter adjusting procedure is terminated. If PRSNR is less than 15.0 or SbER is larger than $5 \times 10^{-5}$, the optical disk is determined as an improper optical disk and discharged.

In the procedure 5, PRSNR is set equal to or more than 15.0 and SbER is set equal to or less than $5 \times 10^{-5}$, but this invention is not limited to this case. For example, PRSNR may be set equal to or more than 13.0 and SbER may be set equal to or less than $5 \times 10^{-4}$.

(Explanation of PRSNR)

PRSNR used for calculation of the recording parameters is explained. A detection error tends to occur in the Viterbi decoding process when the Euclidean distance between passes is short. The Euclidean distance d between different passes is defined by $d^2 = \Sigma \epsilon_i^2$. In this case, it is assumed that a polynomial defined by a code bit series $b_k$ corresponding to one of the passes is set to $B(D) = \Sigma b_k D_k$, a polynomial defined by a code bit series $c_k$ ($b_k$, $c_k$ are set to 0 or 1) corresponding to the other pass is set to $C(D) = \Sigma c_k D_k$, a polynomial which defines a partial response is set to $H(D) = \Sigma h_k D_k$, and $N(D) = (B(D) - C(D)) * H(D) = \Sigma \epsilon_i D_i$. In this case, D indicates a time delay operator using a channel clock time as a unit and $h_k$ indicates a preset partial response characteristic and $h_0 = 1$, $h_1 = 2$, $h_2 = 2$, $h_3 = 2$, $h_4 = 1$ and $h_5$ and succeeding values are all set to 0. Further, a symbol * indicates an operator of the convolution operation. The Euclidean distance between the passes corresponds to a signal component in a system using the PRML identification system.

In a system having a combination of the PR(1,2,2,2,1) characteristic and recording binary data of the minimum run length 1, $\epsilon_i$ and $d^2$ in the small Euclidean distance between the passes are obtained as shown in the TABLE 3.

TABLE 3

| Pattern | $\epsilon_i$ | $d^2$ |
|---|---|---|
| 1 | 12221 | 14 |
| 2 | 1210-1-2-1 | 12 |
| 3 | 121000121 | 12 |
| 4 | 12100000-1-2-1 | 12 |
| 5 | 1210000000-1-2-1 | 12 |
| 6 | 121000000000121 | 12 |

A difference $P(D) \cdot Y(D) = \Sigma v_k D_k$ between the polynomial $Y(D) = \Sigma y_k D_k$ defined by the equalized reproduction signal $y_k$ and the pass $P(D) = A(D)*H(D)$ corresponding to the polynomial $A(D) = \Sigma a_k D_k$ defined by the decoded binary data $a_k$ is called an equalized difference. The influence given by the equalized difference on the pattern 1 can be expressed as follows.

$$\Sigma(v_k + 2v_{k+1} + 2v_{k+2} + 2v_{k+3} + v_{k+4})^2 = N*(14R_0 + 24R_1 + 16R_2 + 8R_3 + 2R_4) \; (R_1 \text{ is defined as } \Sigma v_k v_{k+i/N})$$

Further, the influence corresponds to a noise component for the pattern 1. Likewise, the influences given by the equalized difference on the patterns 2, 3 can be expressed as follows.

$$\Sigma(v_k + 2v_{k+1} + v_{k+2} - v_{k+4} - 2v_{k+3} - v_{k+4})^2 = N*(12R_0 + 16R_1 + 2R_2 - 8R_3 - 12R_4 - 8R_5 - 2R_6)$$

$$\Sigma(v_k + 2v_{k+1} + v_{k+2} + v_{k+6} + 2v_{k+7} + v_{k+8})^2 = N*(12R_0 + 16R_1 + 4R_2 + 2R_4 + 8R_5 + 12R_6 + 8R_7 + 2R_8)$$

Further, the influences correspond to noise components for the patterns 2, 3.

Therefore, the signal/noise ratio S1 of the pattern 1 can be given as follows.

$$S1 = \frac{14 \times 14}{14R_0 + 24R_1 + 16R_2 + 8R_3 + 2R_4}$$
$$= \frac{14}{R_0 + (12R_1 + 8R_2 + 4R_3 + R_4)/7}$$

Likewise, the signal/noise ratios S2, S3 of the patterns 2, 3 can be given as follows.

$$S2 = \frac{12 \times 12}{12R_0 + 16R_1 + 2R_2 - 8R_3 - 12R_4 - 8R_5 - 2R_6}$$
$$= \frac{12}{R_0 + (8R_1 + R_2 - 4R_3 - 6R_4 - 4R_5 - R_6)/6}$$

$$S3 = \frac{12 \times 12}{12R_0 + 16R_1 + 4R_2 + 2R_4 + 8R_5 + 12R_6 + 8R_7 + 2R_8}$$
$$= \frac{12}{R_0 + (8R_1 + 2R_2 + R_4 + 4R_5 + 6R_6 + 4R_7 + R_8)/6}$$

As the signal/noise ratio is lower, the quality of the reproduction signal is worse. The lowest one of S1, S2, S3 is used as PRSNR.

Figure 8:
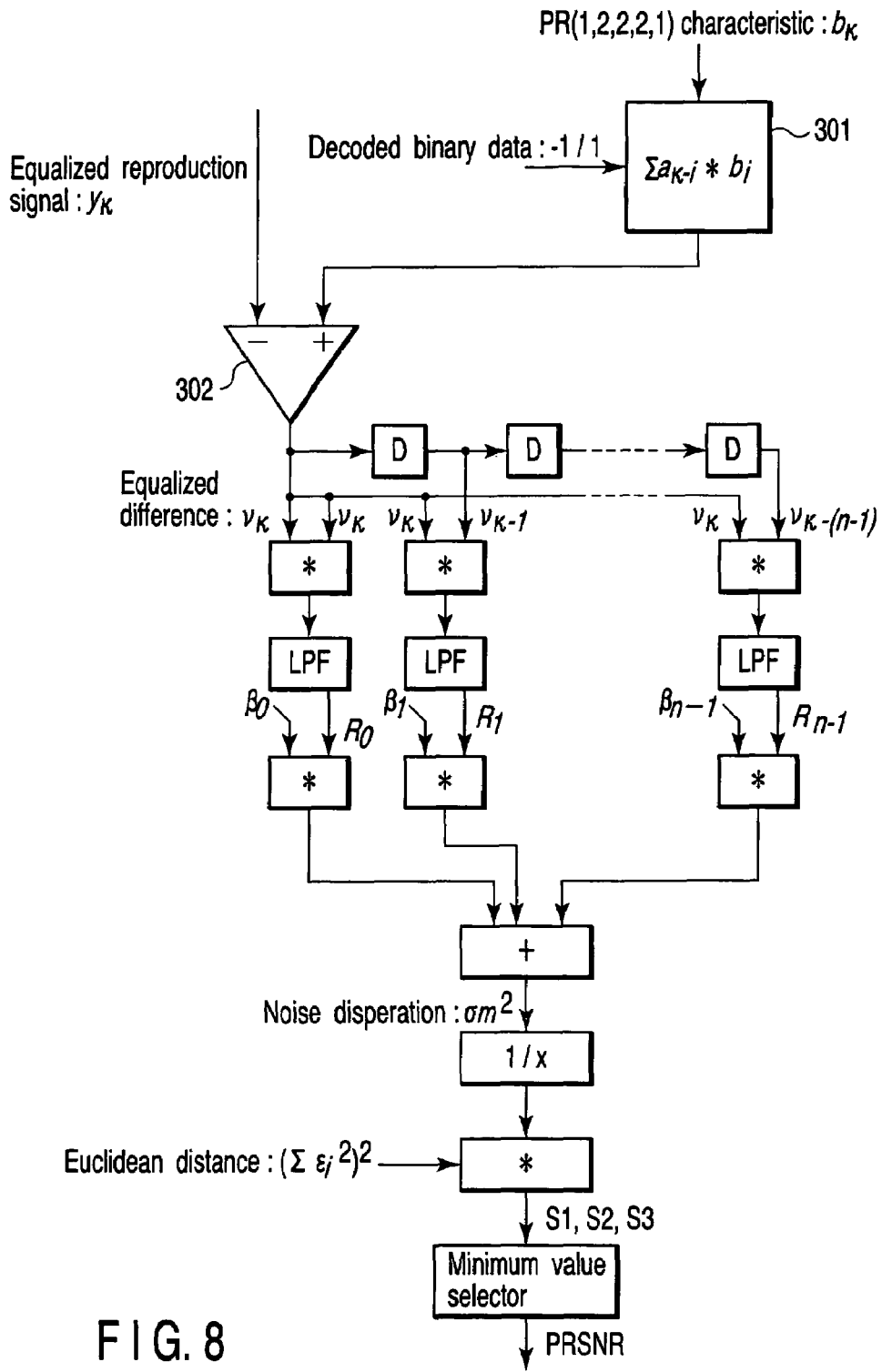
FIG. 8 is a block diagram showing an example of the configuration of a PRSNR calculator.

A concrete internal block diagram of the PRSNR calculator 108 is shown in FIG. 8. As PRSNR is higher, the signal quality becomes higher, and therefore, the recording parameter may be adjusted so as to increase PRSNR.

The signal/noise ratios of the patterns 4, 5, 6 can be derived in the same manner. Therefore, the signal/noise ratios of the patterns 1 to 6 are derived and the minimum value thereof can be used as PRSNR. However, in general, the frequency of occurrence of the patterns 4, 5, 6 is lower than that of the patterns 1, 2, 3. For easy measurement, in this embodiment, PRSNR is derived based on the patterns 1, 2, 3. Further, the signal/noise ratio of a pattern having a larger Euclidean distance between the passes can be derived in the same manner. In order to more precisely evaluate the signal quality, PRSNR can be derived together with the signal/noise ratio with respect to the patterns.

In FIG. 8, a reference symbol 301 denotes a target signal generator which generates a target signal by use of the PR waveform and decoded binary data. A reference symbol 302 denotes a comparator which compares the target signal with an equalized reproduction signal to derive an equalized difference. The above operation process is performed by use of the equalized difference. The autocorrelation of the equalized difference is calculated and weighted by a multiplier by using βi. Then, the sum of the correlation values is derived.

(Explanation of SbER)

Figure 9:
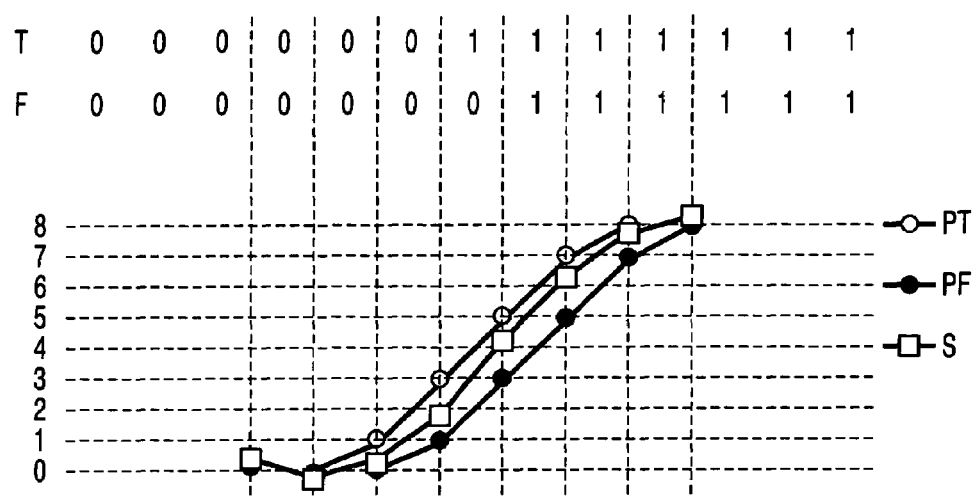
FIG. 9 is a first explanatory diagram showing the basic principle of SbER.

Next, SbER used for calculation of the recording parameter is explained. In the PRSNR identification system, a probability that a recording binary pattern T is erroneously identified as a different binary pattern F is considered. When the equalized reproduction signal is S and the passes of the patterns T, F are PT, PF (refer to FIG. 9), the condition in which the pattern T is erroneously identified as the pattern F is expressed by the following equation.

$$D = E_{PF,S}^2 - E_{PT,S}^2 < 0$$

where $E_{PF,S}$ indicates an Euclidean distance between the pass PF and the reproduction signal S and $E_{PT,S}$ indicates an Euclidean distance between the pass PT and the reproduction signal S. The Euclidean distance between the signals P1 and P2 is given by the following equation.

$$E_{P1,P2} = \sqrt{\sum_i (P1_i - P2_i)^2}$$

Figure 10:
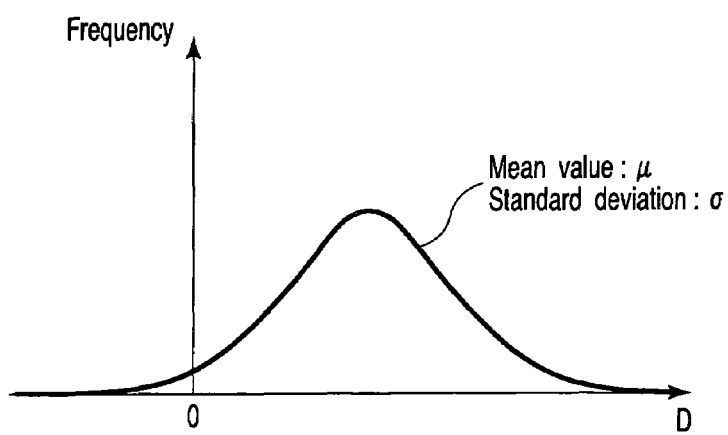
FIG. 10 is a second explanatory diagram showing the basic principle of SbER.

If the distribution of accumulated D values (refer to FIG. 10) indicates a normal distribution and the mean value and standard deviation value thereof are respectively set to μ and σ, the probability F(0) that T is erroneously identified as F can be expressed as follows.

$$F(0) = \int_{-\infty}^{0} \frac{\exp\{-(x-\mu)^2/2\sigma^2\}}{\sigma\sqrt{2\pi}} dx$$

By deriving F(0) with respect to the pattern pair T, F in which errors tend to occur as shown in the TABLE 4, an estimated value SbER of bER (bit error) can be derived as follows.

$$SbER = \Sigma C_T \cdot F(0) \cdot H_{T,F}$$

where $C_T$ indicates the rate of occurrence of the pattern T and $H_{T,F}$ indicates a humming distance.

Figure 11:
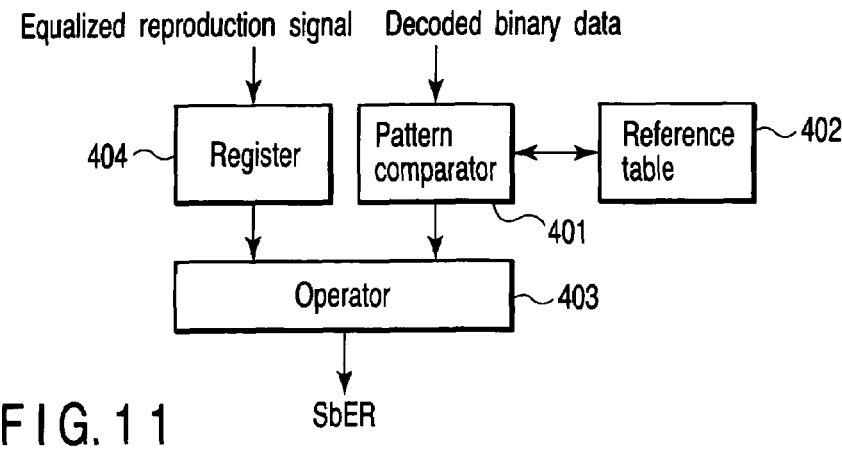
FIG. 11 is a block diagram showing an example of the configuration of an SbER calculator.

FIG. 11 is a concrete internal block diagram of the SbER calculator 109. Decoded binary data is input to a pattern comparator 401. The pattern comparator 401 compares patterns recorded in a reference TABLE 402 with the decoded binary data to detect a pattern which tends to be erroneously identified. The detected pattern is input to an operator 403. The reproduction signal is input to the operator 403 via a register 404. Thus, the operation shown by the above equation is carried out to derive SbER.

TABLE 4

| | Pattern T(F) | Pattern F(T) | $H_{T,F}$ |
|---|---|---|---|
| 1 | 001110000 | 001100000 | 1 |
| 2 | 011110000 | 011100000 | 1 |
| 3 | 111110000 | 111100000 | 1 |
| 4 | 001110001 | 001100001 | 1 |
| 5 | 011110001 | 011100001 | 1 |
| 6 | 111110001 | 111100001 | 1 |
| 7 | 001110011 | 001100011 | 1 |

TABLE 4-continued

| | Pattern T(F) | Pattern F(T) | $H_{T,F}$ |
|---|---|---|---|
| 8 | 011110011 | 011100011 | 1 |
| 9 | 111110011 | 111100011 | 1 |
| 10 | 000011100 | 000001100 | 1 |
| 11 | 000011110 | 000001110 | 1 |
| 12 | 000011111 | 000001111 | 1 |
| 13 | 100011100 | 100001100 | 1 |
| 14 | 100011110 | 100001110 | 1 |
| 15 | 100011111 | 100001111 | 1 |
| 16 | 110011100 | 110001100 | 1 |
| 17 | 110011110 | 110001110 | 1 |
| 18 | 110011111 | 110001111 | 1 |
| 19 | 00111001100 | 00110011100 | 2 |
| 20 | 01111001100 | 01110011100 | 2 |
| 21 | 11111001100 | 11110011100 | 2 |
| 22 | 00111001110 | 00110011110 | 2 |
| 23 | 01111001110 | 01110011110 | 2 |
| 24 | 11111001110 | 11110011110 | 2 |
| 25 | 00111001111 | 00110011111 | 2 |
| 26 | 01111001111 | 01110011111 | 2 |
| 27 | 11111001111 | 11110011111 | 2 |
| 28 | 00001100000 | 00000110000 | 2 |
| 29 | 10001100000 | 10000110000 | 2 |
| 30 | 11001100000 | 11000110000 | 2 |
| 31 | 00001100001 | 00000110001 | 2 |
| 32 | 10001100001 | 10000110001 | 2 |
| 33 | 11001100001 | 11000110001 | 2 |
| 34 | 00001100011 | 00000110011 | 2 |
| 35 | 10001100011 | 10000110011 | 2 |
| 36 | 11001100011 | 11000110011 | 2 |
| 37 | 0011100110000 | 0011001100000 | 3 |
| 38 | 0111100110000 | 0111001100000 | 3 |
| 39 | 1111100110000 | 1111001100000 | 3 |
| 40 | 0011100110001 | 0011001100001 | 3 |
| 41 | 0111100110001 | 0111001100001 | 3 |
| 42 | 1111100110001 | 1111001100001 | 3 |
| 43 | 0011100110011 | 0011001100011 | 3 |
| 44 | 0111100110011 | 0111001100011 | 3 |
| 45 | 1111100110011 | 1111001100011 | 3 |
| 46 | 0000110011100 | 0000011001100 | 3 |
| 47 | 1000110011100 | 1000011001100 | 3 |
| 48 | 1100110011100 | 1100011001100 | 3 |
| 49 | 0000110011110 | 0000011001110 | 3 |
| 50 | 1000110011110 | 1000011001110 | 3 |
| 51 | 1100110011110 | 1100011001110 | 3 |
| 52 | 0000110011111 | 0000011001111 | 3 |
| 53 | 1000110011111 | 1000011001111 | 3 |
| 54 | 1100110011111 | 1100011001111 | 3 |

(Explanation for Adaptive Control Value)

Figure 12:
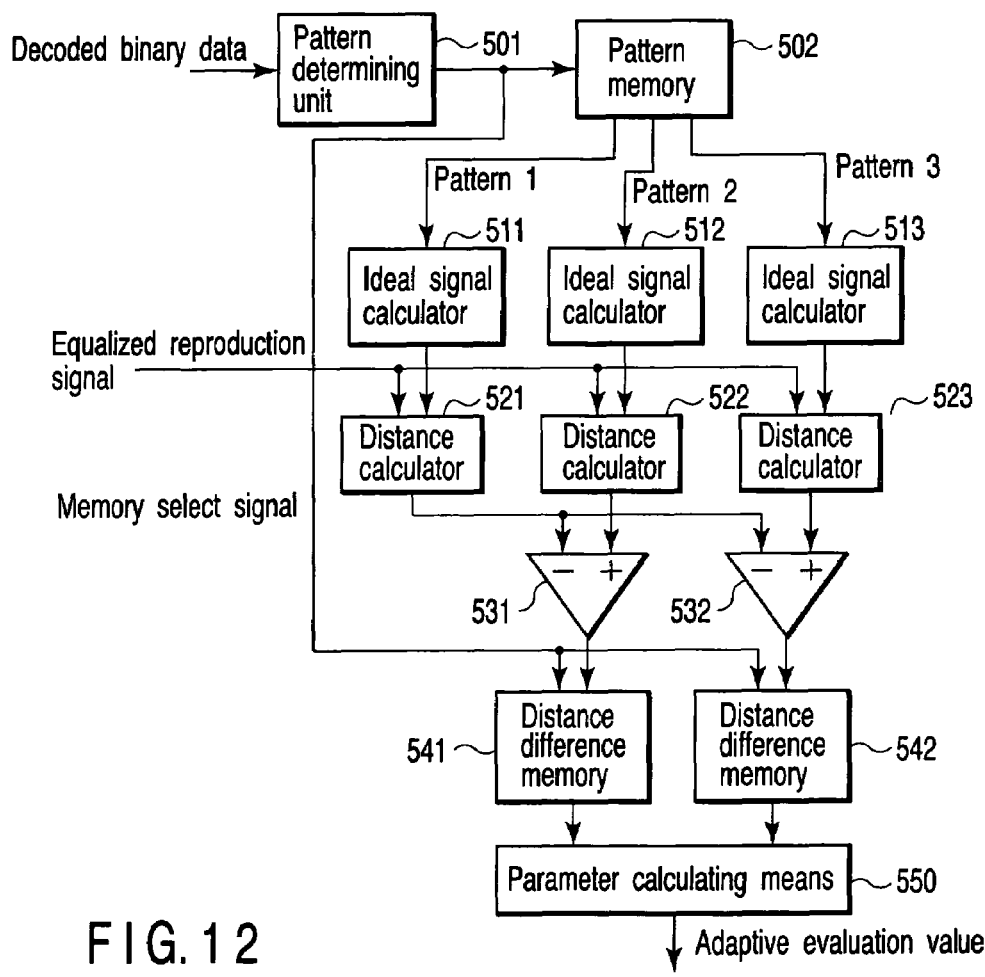
FIG. 12 is a block diagram showing an example of the configuration of an adaptive control value calculator.

FIG. 12 is an internal block diagram of the adaptive control value calculator 110. Several types of preset patterns (pattern 1) are registered in a pattern determining unit 501 and a signal indicating one of the registered patterns is output when decoded binary data coincides with the registered pattern. In a pattern memory 502, three types of patterns (pattern 1, pattern 2, pattern 3) registered therein are output according to the signal from the pattern determining unit. In ideal signal calculators 511, 512, 513, passes corresponding to the PR(1, 2,2,2,1) characteristic are formed based on the output patterns. In distance calculators 521, 522, 523, passes and Euclidean distances (which are respectively set to E1, E2, E3) between the passes and the equalized reproduction signal are calculated. The difference between the Euclidean distances E2 and E1 and the difference between the Euclidean distances E3 and E1 are calculated in difference calculators 531, 532 and stored in distance difference memories 541, 542. The locations of the distance difference memories in which the differences are to be stored are determined depending on the output signal of the pattern determining unit. When a preset amount of data is recorded/reproduced, parameter calculating means 550 calculates an adaptive control value based on data stored in the distance difference memories.

In this embodiment, the lengths of marks and spaces are divided into three types of 2T/3T/≧4T and an adaptive control value is calculated for each pattern with respect to the mark and space. The contents of the pattern 1, pattern 2, pattern 3 stored in the pattern memory are shown in the TABLE 5. First and second columns of the TABLE 5 correspond to the adaptive control parameters of the TABLE 2. For example, the second row of the TABLE 5 shows a pattern used to derive an adaptive control value for 2T space/2T mark recording. The pattern 2 is obtained by changing a portion corresponding to the code bit string "10" (or "01") appearing in the pattern 1 to "00" (or "11"). Further, the pattern 3 is obtained by changing a portion corresponding to the code bit string "10" (or "01") appearing in the center of the pattern 1 to "11" (or "00").

TABLE 5

| $T_{SFP}$, $T_{ELP}$ for Land Track | $T_{SFP}$, $T_{ELP}$ for Land Track | Pattern 2 | Pattern 1 | Pattern 3 |
|---|---|---|---|---|
| Dl | dg | ?110011100? | ?110011100? | ?110001100? |
| gl | gg | 1100111100? | 1100011100? | 1100001100? |
| jl | jg | ?000111100? | ?000011100? | ?000001100? |
| el | eg | ?110111100 | ?110011100 | ?110001100 |
| hl | hg | 1100111100 | 1100011100 | 1100001100 |
| kl | kg | ?000111100 | ?000011100 | ?000001100 |
| fl | fg | ?110111110 | ?110011110 | ?110001110 |
| il | ig | 1100111110 | 1100011110 | 1100001110 |
| ll | lg | ?000111111? | ?000011111? | ?000001111? |
| ml | mg | ?001100111? | ?001100111? | ?001110111? |
| pl | pg | ?001100001? | ?001100001? | ?001110001? |
| sl | sg | ?001100000? | ?001100000? | ?001110000? |
| nl | ng | 0011100111? | 0011100111? | 0011110111? |
| ql | qg | 0011000011 | 0011100011 | 0011110011 |
| tl | tg | ?011100000? | ?011100000? | ?011110000? |
| ol | og | ?111100011? | ?111100011? | ?111110011? |
| rl | rg | ?111100011 | ?111100011 | ?111110011 |
| ul | ug | ?111100000? | ?111110000? | ?111111000? |

In the TABLE 5, "?" expresses a code bit "0" or "1". If "?" in the pattern 1 is "0" ("1"), "?" in a corresponding portion of each of the patterns 2, 3 is also "0" ("1"). For example, the second row of the TABLE 5 is expanded as shown in the TABLE 6.

TABLE 6

| dl | dg | | | |
|---|---|---|---|---|
| | | 0110111000 | 0110011000 | 0110001000 |
| | | 0110111001 | 0110011001 | 0110001001 |
| | | 1110111000 | 1110011000 | 1110001000 |
| | | 1110111001 | 1110011001 | 1110001001 |

Figure 13:
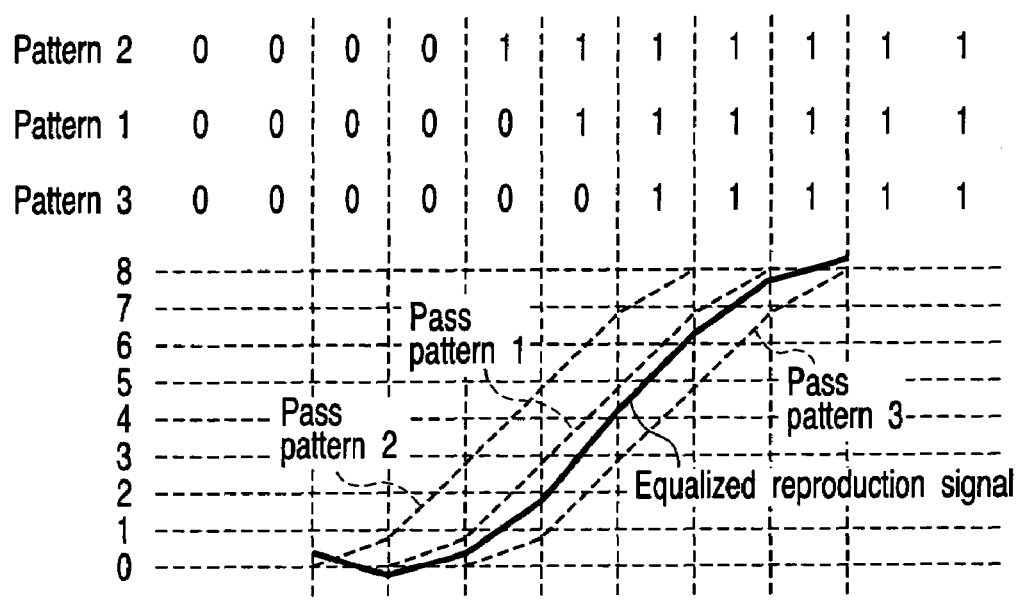
FIG. 13 is a first explanatory diagram showing the basic principle of an adaptive control value.

The basic concept of the adaptive control value calculating operation of this invention is shown in FIGS. 13, 14A, 14B and 15. For example, consider a case wherein the patterns 1, 2, 3 selected by the pattern determining unit each have an arrangement of "0", "1" as shown in the upper portion of FIG. 13. Passes calculated based on the patterns 1, 2, 3 have waveforms shown in the lower portion of FIG. 13. The passes of the patterns 1, 2, 3 shown in FIG. 13 are set to P1(t), P2(t), P3(t) and a reproduction signal is set to Y(t). Then, Euclidean distances E1, E2, E3 between P1(t), P2(t), P3(t) and Y(t) can be expressed as follows.

$$E1 = \Sigma \{Y(t) - P1(t)\}^2$$

$$E2 = \Sigma \{Y(t) - P2(t)\}^2$$

$$E3 = \Sigma \{Y(t) - P3(t)\}^2$$

The condition that the result of identification indicates the pattern E2 even when the pattern 1 is recorded is as follows.

$$E1 > E2$$

Likewise, the condition that the result of identification indicates the pattern E3 even when the pattern 1 is recorded is as follows.

$$E1 > E3$$

In this case, consider the following relation.

$$D2 = E2 - E1$$

$$D3 = E3 - E1$$

Figures 14A, 14B:
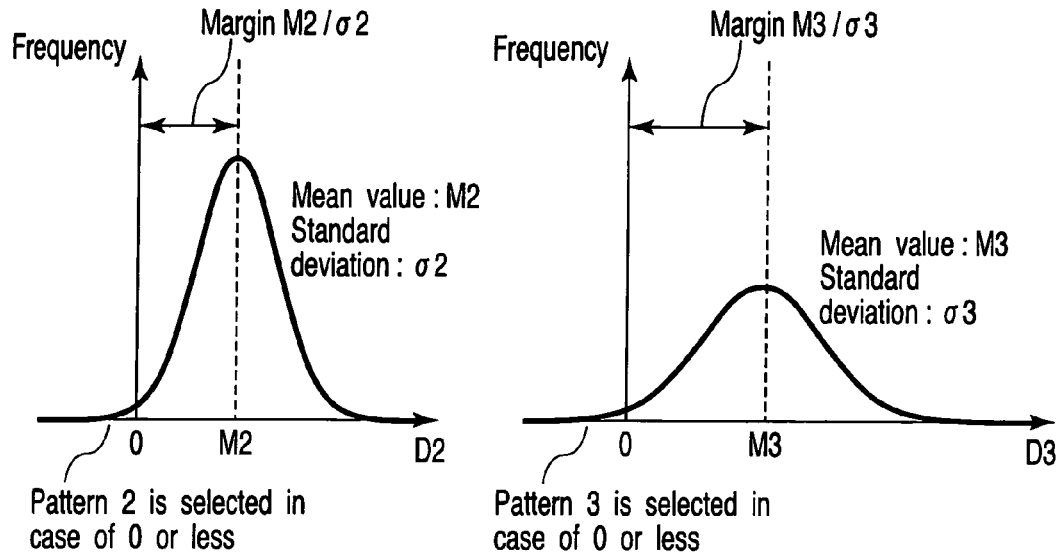
FIGS. 14A and 14B are second explanatory diagrams showing the basic principle of an adaptive control value.

The distributions of D2, D3 are expressed as shown in FIGS. 14A, 14B. In FIGS. 14A, 14B, a region in which the distribution becomes equal to or smaller than "0" corresponds to an identification error. In FIG. 14A, the pattern 2 is selected when the distribution is equal to or less than "0". Further, in FIG. 14B, the pattern 3 is selected when the distribution is equal to or less than "0". If the mean values of D2, D3 are respectively set to M2, M3 and the standard deviations are respectively set to $\sigma 2$, $\sigma 3$, a margin Mgn2 which prevents the identification result from being set to the pattern 2 when the pattern 1 is recorded is obtained as follows.

$$Mgn2 = M2/\sigma 2$$

Likewise, a margin Mgn3 which prevents the identification result from being set to the pattern 3 when the pattern 1 is recorded is obtained as follows.

$$Mgn3 = M2/\sigma 3$$

Figure 15:
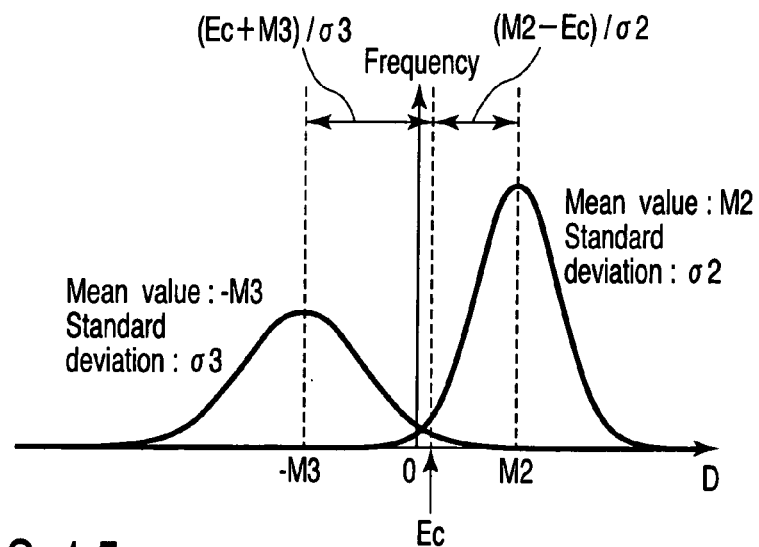
FIG. 15 is a third explanatory diagram showing the basic principle of an adaptive control value.

In this case, it is considered that an event in which the identification result becomes the pattern 2 when the pattern 1 is recorded and an event in which the identification result becomes the pattern 3 are conflicting events. The distributions of D2 and -D3 are shown in FIG. 15. A certain value Ec is provided on the abscissa and margins Mgn2', Mgn3' from the distributions D2 and -D3 to Ec can be expressed as follows.

$$Mgn2' = (M2 - Ec)/\sigma 2$$

$$Mgn3' = (M3 + Ec)/\sigma 3$$

A solution for Ec is attained as follows when the relation of Mgn2'=Mgn3' is set.

$$Ec = (\sigma 3 * M2 - \sigma 2 * M3)(\sigma 2 + \sigma 3)$$

This means that the probability that the identification result becomes the pattern 2 when the pattern 1 is recorded becomes equal to the probability that the identification result becomes the pattern 3 if the whole distributions are shifted by Ec. This corresponds to a case wherein an error occurs with the most difficulty. That is, a preferable recording operation can be performed by controlling the recording waveform corresponding to Ec. The sign of Ec corresponds to whether the mark is made larger or smaller and the absolute value of Ec corresponds to the variation amount of the mark size.

The unit of Ec is a Euclidean distance. The unit of the adaptive control parameters $T_{SFP}$, $T_{ELP}$ is time. It is difficult to convert the Euclidean distance to time.

Therefore, the adaptive control parameters may be adjusted based on Ec as follows. A dead zone is set at or near "0" and the adaptive control value is set to "0" if Ec lies in the dead zone. If Ec is larger than the dead zone, the adaptive control value is set to +1. On the other hand, if Ec is smaller than the dead zone, the adaptive control value is set to −1. The adaptive control parameters $T_{SFP}$, $T_{ELP}$ are increased or decreased by $\Delta T$ (=T/32) according to the adaptive control value [−1, 0, +1]. After the adaptive control parameters $T_{SFP}$, $T_{ELP}$ are increased or decreased by $\Delta T$, they are recorded/reproduced again to derive adaptive control values. The above operation is repeatedly performed until all of the adaptive control values become "0".

In the above example, the operation is repeatedly performed until all of the adaptive control values become "0", but this invention is not limited to this case. For example, the operation may be repeatedly performed until 80% or more of the adaptive control values become "0". Alternatively, the operation may be repeatedly performed until the adaptive control values become approximately equal to "0". Further, the number of repetition times is previously specified and the operation is repeatedly performed by a specified number of times.

The adaptive control values are set to three types of [−1, 0, +1], but this is not limitative. For example, they may be set to five types of [−2, −1, 0, +1, +2]. Further, $\Delta T$ is set to T/32, but it is not limited to this case. For example, $\Delta T$ can be set to T/16.

(Second Recording Parameter Adjusting Procedure)

Figure 16:
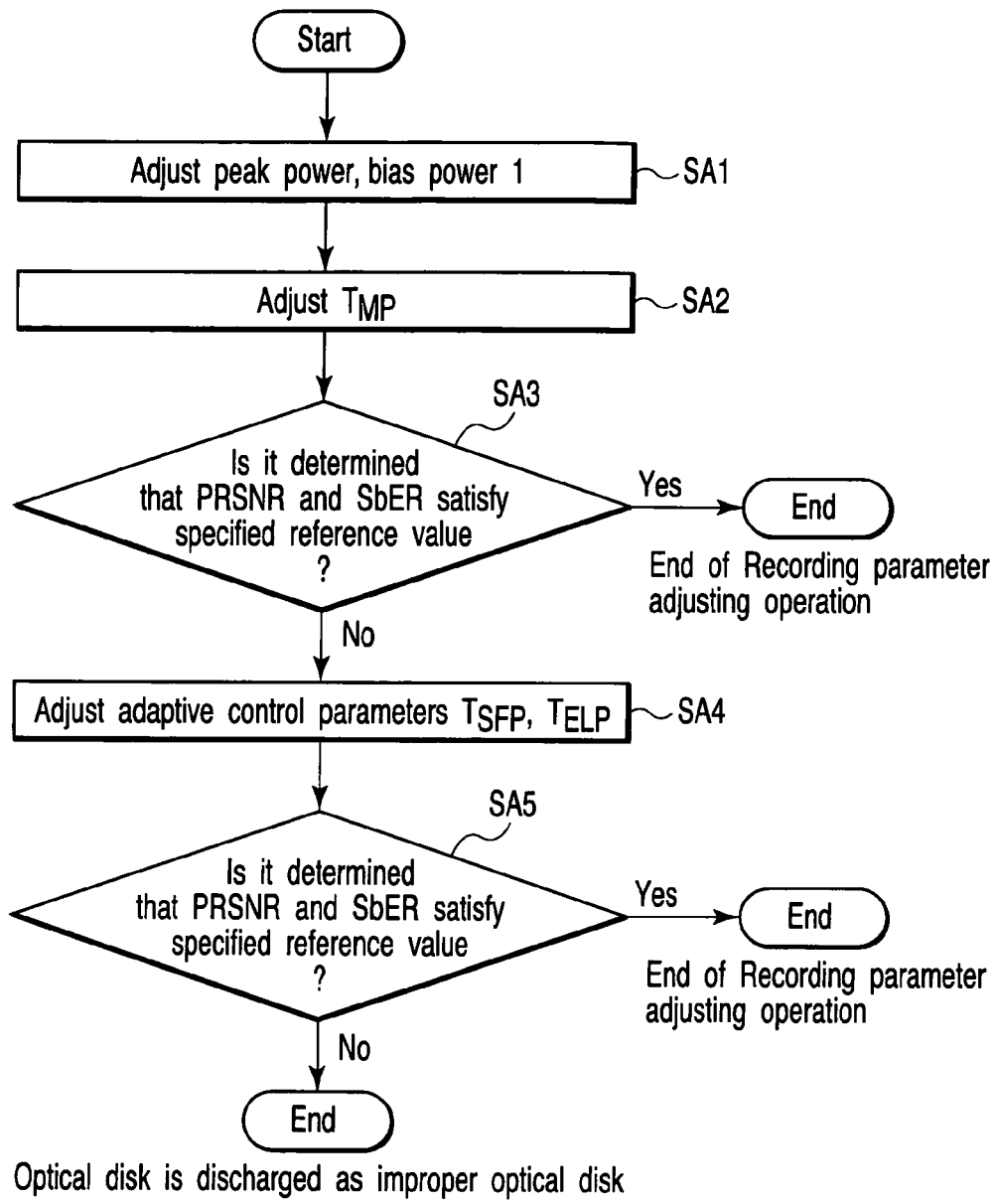
FIG. 16 is a flowchart for illustrating an example of a second optical disk recording/reproducing method according to this invention.

The second recording parameter adjusting procedure of this invention is explained. Since the adjusting procedure of the recording parameter for land tracks and the adjusting procedure of the recording parameter for groove tracks are the same, only the recording parameter adjusting procedure for land tracks is explained here. The outline of the adjusting procedure is shown in FIG. 16.

(Adjusting Peak Power and Bias Power 1: Step SA1 of FIG. 16)

1. The peak power is set to an initial value $P_{P0}$. $P_{P0}$ is previously recorded in a preset position on the optical disk. Data on the corresponding portion is reproduced and a reproduced value is set. Likewise, the bias power 1, bias power 2, bias power 3 are set to initial values $P_{B10}$, $P_{B20}$, $P_{B30}$. $P_{B10}$, $P_{B20}$, $P_{B30}$ are previously recorded in preset positions on the optical disk. Likewise, time-base parameters $T_{SFP}$, $T_{EFP}$, $T_{MP}$, $T_{SLP}$, $T_{ELP}$, $T_{LC}$ are set to initial values. However, $T_{SFP}$, $T_{EFP}$ are each set to nine values shown in the TABLE 2. Likewise, $T_{LC}$ is set to three values shown in the TABLE 2. The initial value of the time-base parameter is previously recorded in a preset position on the optical disk. In this example, the peak power and bias power 1 are treated as variables.

2. After random data is successively recorded ten times on a certain track, the random data is reproduced to derive an equalization coefficient. In the succeeding procedure, the thus derived equalization coefficient is used.

3. Random data is successively recorded ten times on a certain track. The operation of successively recording random data ten times is performed each time the peak power and bias power 1 are adjusted. PRSNR is measured each time the peak power and bias power 1 are adjusted. The peak power and bias power 1 are adjusted so as to increase PRSNR. The adjusting operation is performed to set the ratio of the peak power to the bias power 1 equal to that of $P_{P0}$ to $P_{B10}$.

4. The relation between the peak power and PRSNR is derived in the procedure 3 (refer to FIG. 4).

5. The maximum value of PRSNR is derived.

6. The upper limit value $P_{POU}$ and the lower limit value $P_{POL}$ which is set to 80% or more of the maximum value of PRSNR are derived.

7. The adjusted value $P_{P1}$ of the peak power and the adjusted value $P_{B11}$ of the bias power 1 are derived according to the following equations.

$$P_{P1}=(P_{POL}+P_{POU})/2$$

$$P_{B11}=(P_{B10}/P_{P0})\times P_{P1}$$

An adjusting method of setting the maximum value of PRSNR derived in the procedure 5 to $P_{P1}$ may be used. In the procedure 6, the specified value is set to 80% or more of the maximum value, but this is not limitative. Further, PRSNR is set as an evaluation value, but SbER may be used as an evaluation value. When SbER is used as the evaluation value, the peak power and bias power 1 are adjusted to make the SbER value smaller.

(Adjusting $T_{MP}$: Step SA2 of FIG. 16)

1. The peak power is set to $P_{P1}$. The bias power 1, bias power 2, bias power 3 are set to $P_{B11}$, $P_{B20}$, $P_{B30}$. Time-base parameters $T_{SFP}$, $T_{EFP}$, $T_{MP}$, $T_{SLP}$, $T_{ELP}$, $T_{LC}$ are set to initial values. In this example, $T_{MP}$ is treated as a variable.

2. Random data is successively recorded ten times on a certain track. The operation of successively recording random data ten times is performed each time $T_{MP}$ is adjusted. PRSNR is measured each time $T_{MP}$ is adjusted. $T_{MP}$ is adjusted so as to increase PRSNR.

3. The relation between $T_{MP}$ and PRSNR is derived in the procedure 2 (refer to FIG. 5).

4. The maximum value of PRSNR is derived.

5. The upper limit value $T_{MPU}$ and the lower limit value $T_{MPL}$ of $T_{MP}$ which is set to 80% or more of the maximum value of PRSNR are derived.

6. The adjusted value $T_{MP(cal)}$ of $T_{MP}$ is derived as follows.

$$T_{MP(cal)}=(T_{MPL}+T_{MPU})/2$$

An adjusting method of setting the maximum value of PRSNR derived in the procedure 4 to $T_{MP(cal)}$ may be used. In the procedure 5, the specified value is set to 80% or more of the maximum value, but this is not limitative. Further, PRSNR is set as an evaluation value, but SbER may be used as an evaluation value. When SbER is used as the evaluation value, $T_{MP}$ is adjusted to make the SbER value smaller.

(Determination as to Whether PRSNR and SbER Satisfy Specified Reference Value: Step SA3 of FIG. 16)

1. The peak power is set to $P_{P1}$. The bias power 1, bias power 2, bias power 3 are set to $P_{B11}$, $P_{B20}$, $P_{B30}$. $T_{MP}$ is set to $T_{MP(cal)}$. The other time-base parameters $T_{SFP}$, $T_{EFP}$, $T_{SLP}$, $T_{ELP}$, $T_{LC}$ are set to initial values.

2. Random data is successively recorded ten times on five adjacent tracks.

3. Data recorded on a central one of the tracks used in the procedure 2 is reproduced and an equalization coefficient is derived. The thus derived equalization coefficient is used in the succeeding procedure.

4. PRSNR and SbER are measured.

5. If PRSNR is set equal to or more than 15.0 and SbER is set equal to or less than $5\times10^{-5}$, the recording parameters set in the procedure 1 are used as parameters obtained after adjustment and then the recording parameter adjusting procedure is terminated. If PRSNR is less than 15.0 or SbER is larger than $5\times10^{-5}$, the following adaptive control parameter adjusting procedure is performed.

In the procedure 5, PRSNR is set equal to or more than 15.0 and SbER is set equal to or less than $5\times10^{-5}$, but this invention is not limited to this case. For example, PRSNR may be set equal to or more than 13.0 and SbER may be set equal to or less than $5\times10^{-4}$.

(Adjustment of Adaptive Control Parameters $T_{SFP}$, $T_{ELP}$: Step SA4 in FIG. 16)

1. The peak power is set to $P_{P1}$. The bias power 1, bias power 2 and bias power 3 are set to initial values $P_{B11}$, $P_{B20}$ and $P_{B30}$. $T_{MP}$ is set to $T_{MP(cal)}$. The other time-base parameters $T_{SFP}$, $T_{EFP}$, $T_{SLP}$, $T_{ELP}$, $T_{LC}$ are set to initial values. In this example, nine types of $T_{SFP}$, $T_{EFP}$, that is, d1, e1, f1, g1, h1, i1 j1, k1, l1, m1, n1, o1, p1, q1, r1, s1, t1, u1 shown in the TABLE 2 are independently adjusted.

2. Random data of the length equal to or larger than 928512 channel bits is successively recorded ten times on a certain track. The operation of successively recording random data ten times is performed each time $T_{SFP}$, $T_{ELP}$ are adjusted.

3. The adaptive control value is measured. The adaptive control value is calculated for each of nine types of $T_{SFP}$, $T_{ELP}$ and the value is set to +1, 0 or −1.

4. If the adaptive control value for certain $T_{SFP}$ ($T_{ELP}$) is +1, $T_{SFP}$ ($T_{ELP}$) is reduced (increased) by time $\Delta T$. If the adaptive control value for certain $T_{SFP}$ ($T_{ELP}$) is −1, $T_{SFP}$ ($T_{ELP}$) is increased (reduced) by time $\Delta T$. In this case, $\Delta T$ is T/32.

5. The procedures 2 to 4 are repeatedly performed until all of the adaptive control values are set to 0. If all of the adaptive control values are set to 0, $T_{SFP}$ and $T_{ELP}$ obtained at this time are respectively set to $T_{SFP(cal)}$ and $T_{ELP(cal)}$.

In the above example, the operation is repeatedly performed until all of the adaptive control values become "0", but this invention is not limited to this case. For example, the operation may be repeatedly performed until 80% or more of the adaptive control values become "0". Alternatively, the operation may be repeatedly performed until the adaptive control values become approximately equal to "0". Further, the number of repetition times is previously specified and the operation may be repeatedly performed by a specified number of times.

The adaptive control values are set to three types of [−1, 0, +1], but this is not limitative. For example, they may be set to five types of [−2, −1, 0, +1, +2]. Further, $\Delta T$ is set to T/32, but it is not limited to this case. For example, $\Delta T$ can be set to T/16.

(Determination as to Whether Optical Disk is Improper or Not: Step SA5 in FIG. 16)

1. The peak power is set to $P_{P1}$. The bias power 1, bias power 2 and bias power 3 are set to initial values $P_{B11}$, $P_{B20}$ and $P_{B30}$. $T_{MP}$, $T_{SFP}$, $T_{ELP}$ are respectively set to $T_{MP(cal)}$, $T_{SFP(cal)}$, $T_{ELP(cal)}$. The other time-base parameters $T_{EFP}$, $T_{ELP}$, $T_{LC}$ are set to initial values.

2. Random data is successively recorded ten times on five adjacent tracks.

3. Data recorded on a central one of the tracks used in the procedure 2 is reproduced and an equalization coefficient is derived. In the succeeding procedure, the thus derived equalization coefficient is used.

4. PRSNR and SbER are measured.

5. If PRSNR is set equal to or more than 15.0 and SbER is set equal to or less than $5\times10^{-5}$, the recording parameters set in the procedure 1 are used as parameters obtained after adjustment and then the recording parameter adjusting procedure is terminated. If PRSNR is less than 15.0 or SbER is larger than $5\times10^{-5}$, the optical disk is determined as an improper optical disk and discharged.

In the procedure 5, PRSNR is set equal to or more than 15.0 and SbER is set equal to or less than $5\times10^{-5}$, but this invention is not limited to this case. For example, PRSNR may be set equal to or more than 13.0 and SbER may be set equal to or less than $5\times10^{-4}$.

(Rectangular Recording Waveform)

Figure 17:
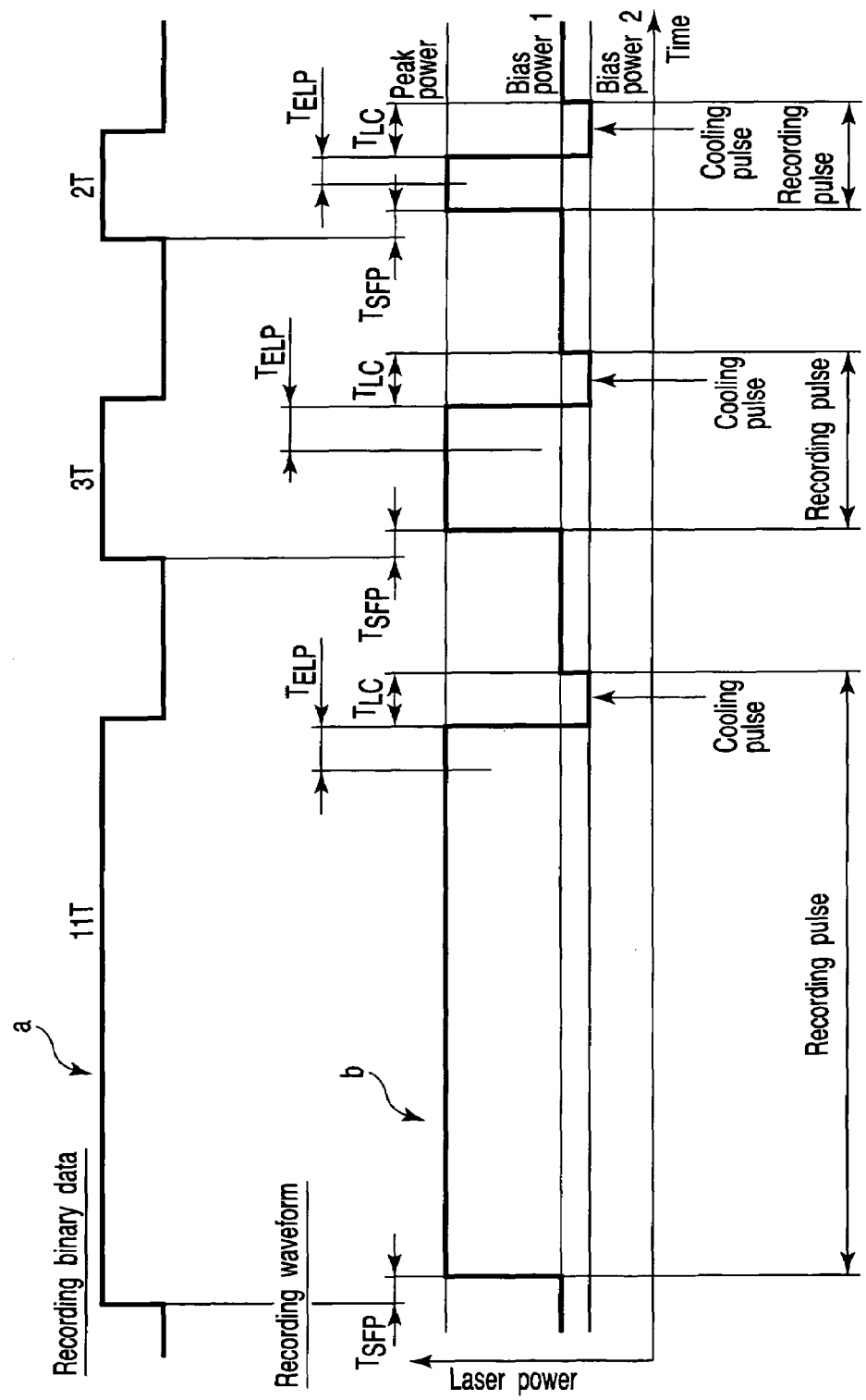
FIG. 17 is a diagram showing an example of a second recording waveform of this invention.

In the first and second inventions, a so-called multi-pulse waveform is used as a recording waveform. However, this invention is not limited to this case and a rectangular waveform such as a recording waveform ("b" in FIG. 17) may be used. "a" in FIG. 17 indicates recording binary data. In this case, the recording parameters are shown in the TABLE 7.

TABLE 7

| Recording Parameter for Land Track | Peak Power, Bias Power 1, Bias Power 2, $T_{SFP}$, $T_{ELP}$, $T_{LC}$ |
|---|---|
| Recording Parameter for Groove Track | Peak Power, Bias Power 1, Bias Power 2, $T_{SFP}$, $T_{ELP}$, $T_{LC}$ |

Figure 18:
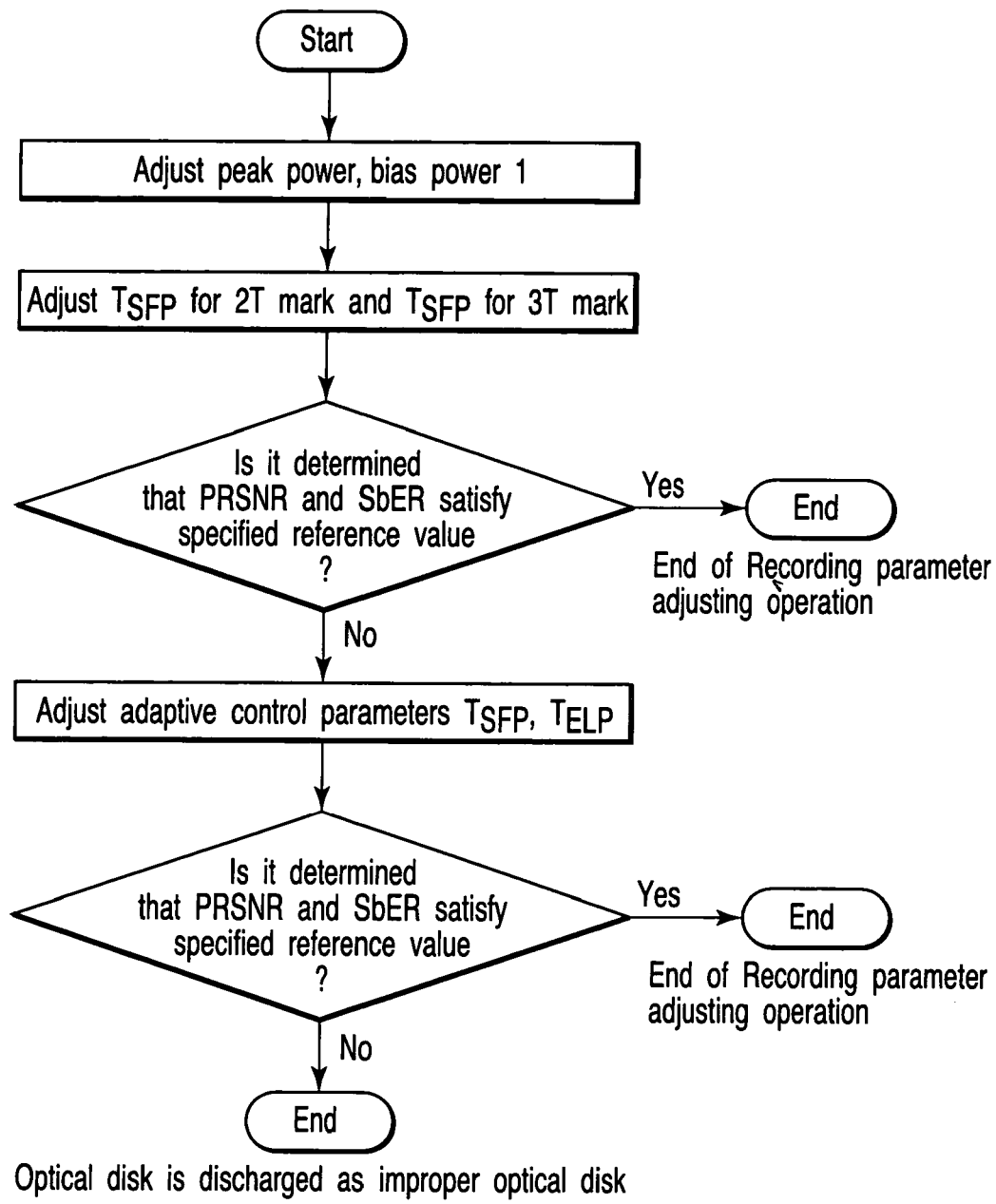
FIG. 18 is a flowchart for illustrating an example of a third optical disk recording/reproducing method according to this invention.
Figure 19:
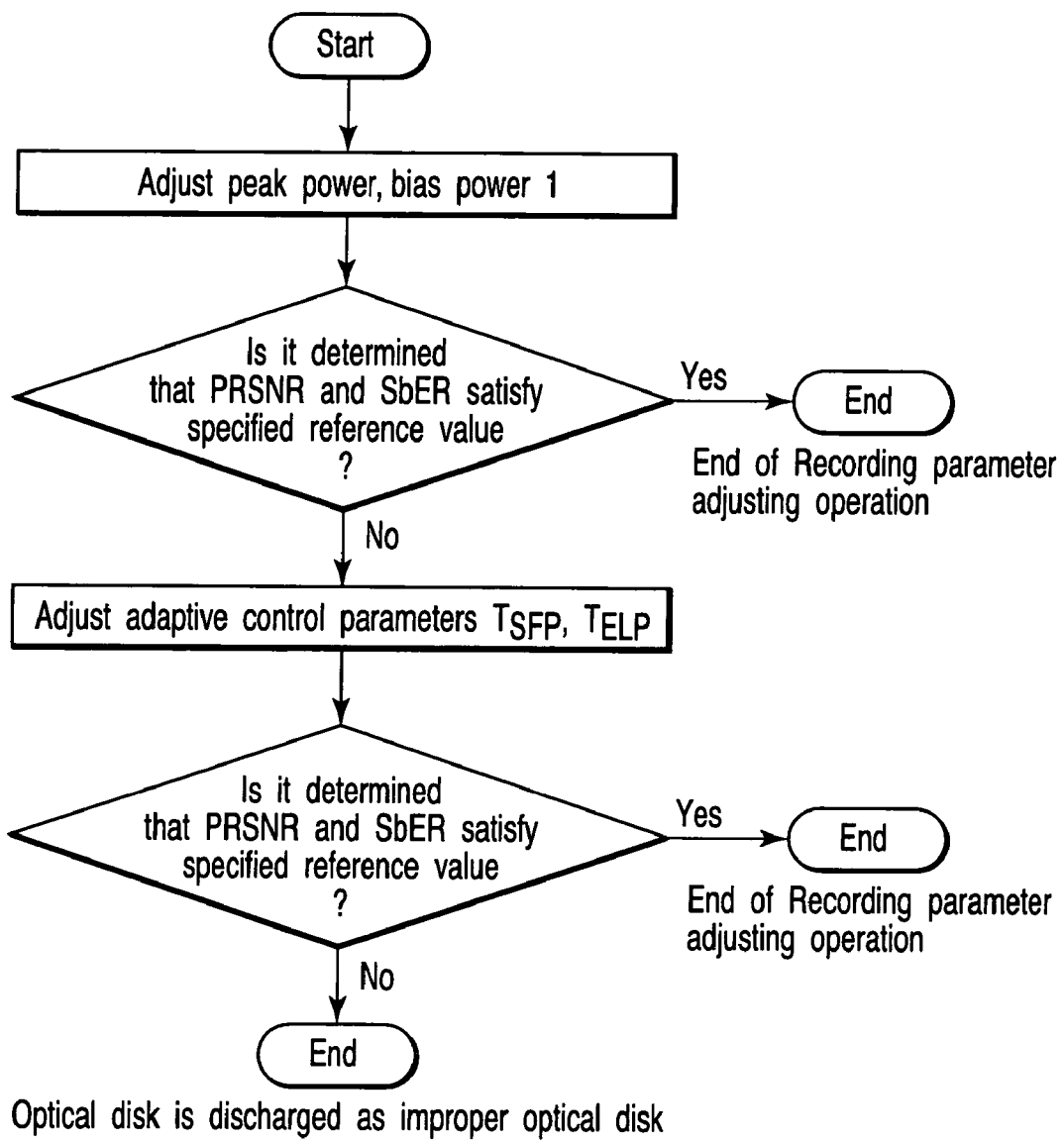
FIG. 19 is a flowchart for illustrating an example of a fourth optical disk recording/reproducing method according to this invention.

The recording parameter adjusting procedure used when the rectangular wave is used as the recording wave is shown in FIG. 18 or 19.

Figure 20:
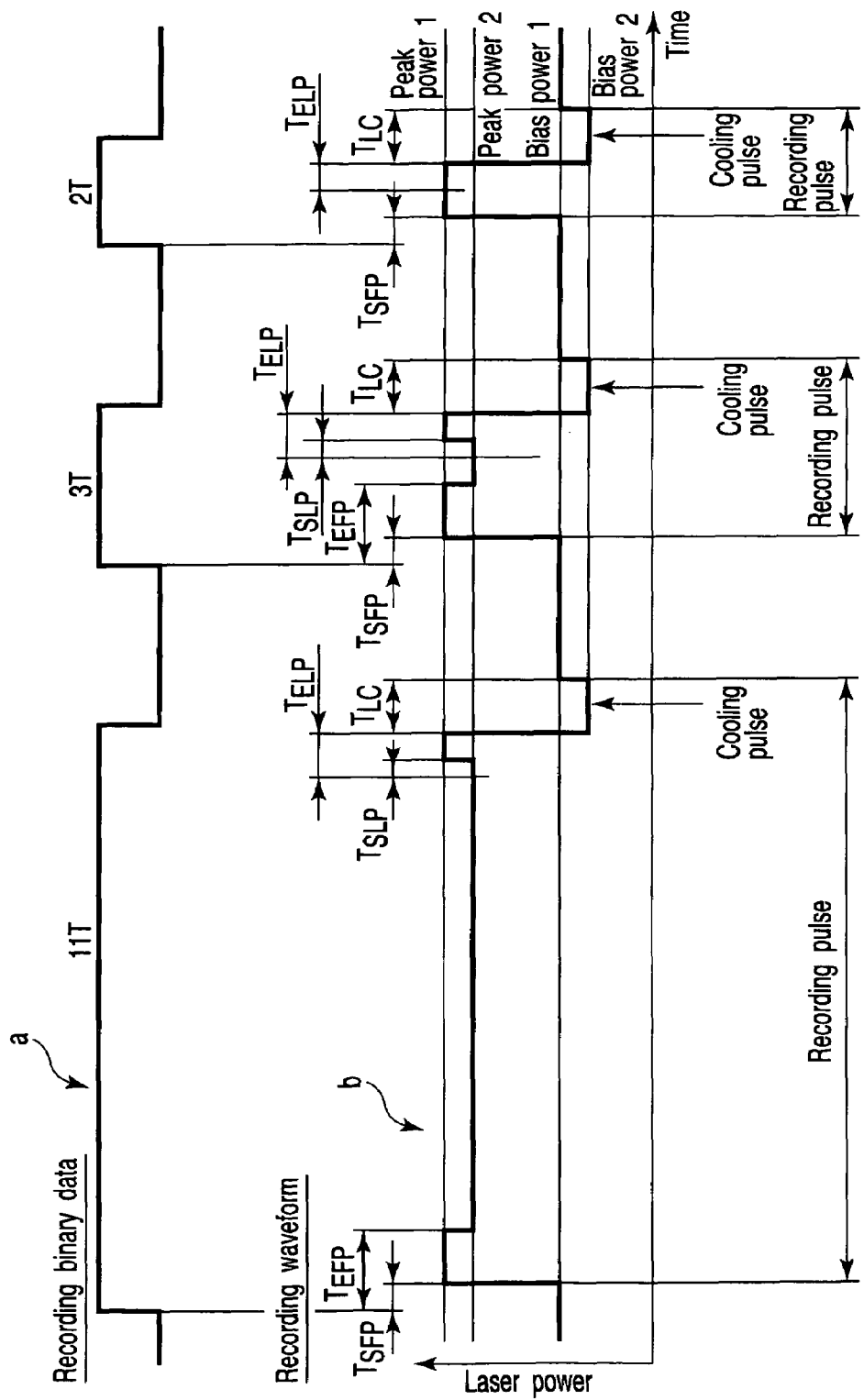
FIG. 20 is a diagram showing an example of a third recording waveform of this invention.

A waveform shown in FIG. 20 obtained by modifying the rectangular recording waveform can be used as the recording waveform "b". "a" in FIG. 20 is recording binary data. The recording wave to which this invention can be applied is not limited to the above case.

In the above embodiments, a so-called land & groove recording type optical disk is used. However, this invention is not limited to this case and an optical disk in which information is recorded only on the land or groove can be used.

In the above embodiments, the mark length and space length are classified into three groups of 2T, 3T and $\geq$4T, but this invention is not limited to this case. For example, the mark length and space length can be classified into four groups of 2T, 3T, 4T and $\geq$5T.

In the above embodiments, PR(1,2,2,2,1) is used, but this invention is not limited to this case. For example, this invention can be applied to another PR class, for example, PR(1, 2,2,1) or PR(3,4,4,3).

In the above embodiments, a case wherein the minimum run length is "1" is explained, but this invention is not limited to this case. For example, this invention can be applied to a case wherein the minimum run length is "2".

As described above, in the optical disk system using the PRML identification system, optimum recording parameters can be derived by the optical disk recording/reproducing method of this invention. Further, in the optical disk system using the PRML identification system, the recording parameter can be derived in a short period of time by use of the optical disk recording/reproducing method of this invention. An optical disk recording/reproducing apparatus which can correctly record/reproduce information can be provided by using a recording wave derived by use of the optical disk recording/reproducing method of this invention. Further, it is possible to provide an optical disk on which information is correctly recorded by recording information by use of a recording wave derived according to the optical disk recording/reproducing method of this invention.

This invention is not limited to the above embodiments and can be variously modified without departing from the technical scope thereof at the embodying stage. Further, various inventions can be made by adequately combining a plurality of constituents disclosed in the above embodiments. For example, some constituents can be omitted from the whole constituents shown in the above embodiments. In addition, constituents over the different embodiments can be adequately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk recording/reproducing method comprising:
    determining a first recording parameter used to set a recording waveform according to a first recording parameter adjusting method,
    recording information on a medium by use of the first recording parameter,
    deriving a first evaluation value of signal quality based on a reproduction signal of the recording information by use of a signal quality evaluating method,
    terminating a recording parameter adjusting operation when the first evaluation value satisfies a previously specified value,
    determining a second recording parameter used to set a recording waveform according to a second recording parameter adjusting method when the first evaluation value does not satisfy the previously specified value,
    recording information on the medium by use of the second recording parameter,
    deriving a second evaluation value of signal quality based on a reproduction signal of the recording information by use of the signal quality evaluating method,
    terminating the recording parameter adjusting operation when the second evaluation value satisfies a previously specified value, and
    determining an improper optical disk when the second evaluation value does not satisfy the previously specified value,
    wherein the first recording parameter adjusting method includes at least one of an adjusting method which does not depend on a recording data bit string and an adjusting method which depends on consecutive length of code bits "1" of a recording data bit string, and the second recording parameter adjusting method is an adjusting method which depends on consecutive length of code bits "1" of a recording data bit string and consecutive length of code bits "0" adjacent thereto.

2. The method according to claim 1, wherein the signal quality evaluating method contains at least two types of signal quality evaluating methods.

3. The method according to claim 1, wherein the relation between the recording parameter and the evaluation value is measured, an optimum value of the evaluation value is derived based on the measurement result and the recording parameter which causes the evaluation value to be set to the optimum value is used as an adjusting value.

4. The method according to claim 1, wherein the relation between the recording parameter and the evaluation value is measured, an optimum value of the evaluation value is derived based on the measurement result, a certain value which is not larger than the optimum value is used as a specified value, an upper limit value and a lower limit value of the recording parameter which satisfies the specified value are derived and an intermediate value between the upper limit value and the lower limit value is used as a recording parameter adjusting value.

5. The method according to claim 1, wherein the evaluation value contains at least one of PRSNR (Partial Response Signal to Noise Ratio) and SbER (Simulated bit Error Rate).

6. The method according to claim 1, wherein recording power based on the recording waveform is adjusted in the first and second recording parameter adjusting methods.

7. The method according to claim 1, wherein multi-pulse width based on the recording waveform is adjusted in the first and second recording parameter adjusting methods.

8. The method according to claim 1, wherein at least one of a recording parameter of the shortest mark of the recording waveform and a recording parameter of the second shortest mark is adjusted in the first and second recording parameter adjusting methods.

9. The method according to claim 1, wherein at least one of a first pulse, last pulse, single pulse and last cooling pulse of the recording waveform is adjusted in the second recording parameter adjusting method.

10. An optical disk recording/reproducing apparatus comprising:
   means for determining a first recording parameter used to set a recording waveform according to a first recording parameter adjusting method,
   means for recording information on a medium by use of the first recording parameter,
   means for deriving a first evaluation value of signal quality based on a reproduction signal of the recording information by use of a signal quality evaluating method,
   means for terminating a recording parameter adjusting operation when the first evaluation value satisfies a preset specified value,
   means for determining a second recording parameter used to set the recording waveform according to a second recording parameter adjusting method when the first evaluation value does not satisfy the preset specified value,
   means for recording information on the medium by use of the second recording parameter,
   means for deriving a second evaluation value of signal quality based on a reproduction signal of the recording information by use of the signal quality evaluating method, and
   means for terminating the recording parameter adjusting operation when the second evaluation value satisfies a preset specified value and determining an improper optical disk when the second evaluation value does not satisfy the preset specified value,
   wherein the first recording parameter adjusting method includes at least one of an adjusting method which does not depend on a recording data bit string and an adjusting method which depends on consecutive length of code bits "1" of a recording data bit string, and the second recording parameter adjusting method is an adjusting method which depends on consecutive length of code bits "1" of a recording data bit string and consecutive length of code bits "0" adjacent thereto.

11. The optical disk recording/reproducing apparatus according to claim 10, wherein the means for determining the first and second recording parameters adjusts recording power by use of the recording waveform.

12. The optical disk recording/reproducing apparatus according to claim 10, wherein the means for determining the first and second recording parameters adjusts multi-pulse width by use of the recording waveform.

13. The optical disk recording/reproducing apparatus according to claim 10, wherein the means for determining the first and second recording parameters adjusts at least one of a recording parameter of the shortest mark of the recording waveform and a recording parameter of the second shortest mark.

14. The optical disk recording/reproducing apparatus according to claim 10, wherein the first and second evaluation values each contain at least one of PRSNR (Partial Response Signal to Noise Ratio) and SbER (Simulated bit Error Rate).

* * * * *